(12) United States Patent
Barron et al.

(10) Patent No.: US 7,428,531 B2
(45) Date of Patent: Sep. 23, 2008

(54) CUSTOMER INFORMATION MANAGEMENT SYSTEM AND METHOD

(75) Inventors: Lydia Barron, Somerset, NJ (US); Mary Alexion, Chapel Hill, NC (US); Marina Zamalin, Ridgewood, NJ (US); Shah Jahan, Mahwah, NJ (US); Michael E. Berman, Roslyn Hts., NY (US); Olutayo Ibikunle, Upper Moniclair, NJ (US)

(73) Assignee: JPMorgan Chase Bank, N.A., New York, NY (US)

( * ) Notice: Subject to any disclaimer, the term of this patent is extended or adjusted under 35 U.S.C. 154(b) by 465 days.

(21) Appl. No.: 10/359,214

(22) Filed: Feb. 6, 2003

(65) Prior Publication Data

US 2004/0034661 A1 Feb. 19, 2004

Related U.S. Application Data

(60) Provisional application No. 60/354,809, filed on Feb. 6, 2002.

(51) Int. Cl.
G06F 7/00 (2006.01)
(52) U.S. Cl. .............................. 707/4; 707/10; 707/102
(58) Field of Classification Search ...................... 707/3, 707/4, 10, 102
See application file for complete search history.

(56) References Cited

U.S. PATENT DOCUMENTS 4,321,672 A 3/1982 Braun et al.
4,355,372 A 10/1982 Johnson et al.
4,495,018 A 1/1985 Vohrer (Continued)

FOREIGN PATENT DOCUMENTS

JP 7-152960 6/1995

(Continued)

OTHER PUBLICATIONS

Delivering the Right Information to the Right Resource or Every Customer Interaction; Intelligent Callrouter, www.geotel.com/solutions/icr/default/htm, 1998, 1 page.

(Continued)

Primary Examiner—John Cottingham
Assistant Examiner—Robert Timblin
(74) Attorney, Agent, or Firm—Hunton & Williams LLP

(57) ABSTRACT

A customer information management system which enables integration of data across lines of business that classify data using distinct formats. In the system, a plurality of lines of business are in communication with one another and with a customer server. A customer information model produces a common classification format used by the customer server. Adapters at each line of business translate information between the format used by the customer server and the format used by the respective line of business. In use, the customer server may glean information from all of the lines of business and produce detailed data stores about customers. A first line of business may also obtain information from a second line of business by making a request through the customer server.

24 Claims, 19 Drawing Sheets

U.S. PATENT DOCUMENTS

| | | | |
|---|---|---|---|
| 4,633,397 A | 12/1986 | Macco | |
| 4,694,397 A | 9/1987 | Grant et al. | |
| 4,722,054 A | 1/1988 | Yorozu et al. | |
| 4,745,468 A | 5/1988 | Von Kohorn | |
| 4,752,877 A | 6/1988 | Roberts et al. | |
| 4,774,664 A | 9/1988 | Campbell et al. | |
| 4,797,911 A | 1/1989 | Szlam et al. | |
| 4,812,628 A | 3/1989 | Boston | |
| 4,914,587 A | 4/1990 | Clouse | |
| 4,926,255 A | 5/1990 | Von Kohorn | |
| 4,932,046 A | 6/1990 | Katz et al. | |
| 4,948,174 A | 8/1990 | Thomson et al. | |
| 4,972,504 A | 11/1990 | Daniel, Jr. | |
| 4,974,878 A | 12/1990 | Josephson | |
| 5,041,972 A | 8/1991 | Frost | |
| 5,050,207 A | 9/1991 | Hitchcock | |
| 5,121,945 A | 6/1992 | Thomson et al. | |
| 5,157,717 A | 10/1992 | Hitchcock | |
| 5,179,584 A | 1/1993 | Tsumura | |
| 5,220,501 A | 6/1993 | Lawlor | |
| 5,225,978 A | 7/1993 | Peterson | |
| 5,259,023 A | 11/1993 | Katz | |
| 5,260,778 A | 11/1993 | Kauffman | |
| 5,287,269 A | 2/1994 | Dorrough et al. | |
| 5,383,113 A | 1/1995 | Knight | |
| 5,402,474 A | 3/1995 | Miller | |
| 5,424,938 A | 6/1995 | Wagner | |
| 5,465,206 A | 11/1995 | Hilt et al. | |
| 5,483,444 A | 1/1996 | Meintzeman et al. | |
| 5,483,445 A | 1/1996 | Pickering | |
| 5,490,060 A | 2/1996 | Malec | |
| 5,523,942 A | 6/1996 | Tyler | |
| 5,532,920 A | 7/1996 | Hartrick | |
| 5,555,299 A | 9/1996 | Maloney et al. | |
| 5,559,855 A | 9/1996 | Dowens et al. | |
| 5,561,707 A | 10/1996 | Katz | |
| 5,570,465 A | 10/1996 | Tsakanikas | |
| 5,583,759 A | 12/1996 | Geer | |
| 5,594,791 A | 1/1997 | Szlam et al. | |
| 5,599,528 A | 2/1997 | Igaki | |
| 5,615,341 A | 3/1997 | Agrawal et al. | |
| 5,652,786 A | 7/1997 | Rogers | |
| 5,659,165 A | 8/1997 | Jennings | |
| 5,684,863 A | 11/1997 | Katz | |
| 5,699,528 A | 12/1997 | Hogan | |
| 5,710,889 A | 1/1998 | Clark et al. | |
| 5,715,298 A | 2/1998 | Rogers | |
| 5,715,450 A | 2/1998 | Ambrose | |
| 5,727,153 A | 3/1998 | Powell | |
| 5,742,775 A | 4/1998 | King | |
| 5,745,706 A | 4/1998 | Wolfberg et al. | |
| 5,757,904 A | 5/1998 | Anderson | |
| 5,758,126 A | 5/1998 | Daniels et al. | |
| 5,761,647 A | 6/1998 | Boushy | |
| 5,765,142 A | 6/1998 | Allred et al. | |
| 5,787,403 A | 7/1998 | Randle | |
| 5,793,846 A | 8/1998 | Katz | |
| 5,794,221 A | 8/1998 | Egendorf | |
| 5,802,498 A | 9/1998 | Comesanas | |
| 5,802,499 A | 9/1998 | Sampson et al. | |
| 5,815,551 A | 9/1998 | Katz | |
| 5,819,238 A | 10/1998 | Fernholz | |
| 5,826,241 A | 10/1998 | Stein | |
| 5,832,447 A | 11/1998 | Rieker | |
| 5,832,460 A | 11/1998 | Bednar | |
| 5,835,087 A | 11/1998 | Herz | |
| 5,835,580 A | 11/1998 | Fraser | |
| 5,835,603 A | 11/1998 | Coutts | |
| 5,842,211 A | 11/1998 | Horadan | |
| 5,862,223 A | 1/1999 | Walker | |
| 5,870,456 A | 2/1999 | Rogers | |
| 5,870,721 A | 2/1999 | Norris | |
| 5,870,724 A | 2/1999 | Lawlor | |
| 5,873,072 A | 2/1999 | Kight | |
| 5,875,437 A | 2/1999 | Atkins | |
| 5,884,032 A | 3/1999 | Bateman | |
| 5,884,288 A | 3/1999 | Chang | |
| 5,884,310 A * | 3/1999 | Brichta et al. | 707/10 |
| 5,890,140 A | 3/1999 | Clark et al. | |
| 5,897,625 A | 4/1999 | Gustin | |
| 5,899,982 A | 5/1999 | Randle | |
| 5,903,881 A | 5/1999 | Schrader | |
| 5,920,847 A | 7/1999 | Kolling et al. | |
| 5,923,745 A | 7/1999 | Hurd | |
| 5,940,811 A | 8/1999 | Norris | |
| 5,943,656 A | 8/1999 | Crooks | |
| 5,953,406 A | 9/1999 | LaRue et al. | |
| 5,966,695 A | 10/1999 | Melchione et al. | |
| 5,966,698 A | 10/1999 | Pollin | |
| 5,970,467 A | 10/1999 | Alavi | |
| 5,974,396 A | 10/1999 | Anderson | |
| 5,978,780 A | 11/1999 | Watson | |
| 5,987,435 A | 11/1999 | Weiss et al. | |
| 5,991,750 A | 11/1999 | Watson | |
| 5,995,942 A | 11/1999 | Smith et al. | |
| 5,995,948 A | 11/1999 | Whitford | |
| 6,006,207 A | 12/1999 | Mumick et al. | |
| 6,016,344 A | 1/2000 | Katz | |
| 6,016,482 A | 1/2000 | Molinari et al. | |
| 6,018,722 A | 1/2000 | Ray et al. | |
| 6,026,370 A | 2/2000 | Jermyn | |
| 6,029,139 A | 2/2000 | Cunningham et al. | |
| 6,032,125 A | 2/2000 | Ando | |
| 6,038,552 A | 3/2000 | Fleischl et al. | |
| 6,049,782 A | 4/2000 | Gottesman et al. | |
| 6,055,510 A | 4/2000 | Henrick | |
| 6,058,378 A | 5/2000 | Clark et al. | |
| 6,070,147 A | 5/2000 | Harms et al. | |
| 6,070,150 A | 5/2000 | Remington et al. | |
| 6,078,892 A | 6/2000 | Anderson et al. | |
| 6,088,685 A | 7/2000 | Kiron et al. | |
| 6,098,052 A | 8/2000 | Kosiba et al. | |
| 6,100,891 A | 8/2000 | Thorne | |
| 6,101,486 A | 8/2000 | Roberts et al. | |
| 6,148,293 A | 11/2000 | King | |
| 6,151,584 A | 11/2000 | Papierniak et al. | |
| 6,157,924 A | 12/2000 | Austin | |
| 6,212,178 B1 | 4/2001 | Beck et al. | |
| 6,226,623 B1 | 5/2001 | Schein et al. | |
| 6,230,287 B1 | 5/2001 | Pinard et al. | |
| 6,233,332 B1 | 5/2001 | Anderson et al. | |
| 6,233,566 B1 | 5/2001 | Levine et al. | |
| 6,278,981 B1 | 8/2001 | Dembo et al. | |
| 6,301,567 B1 | 10/2001 | Leong et al. | |
| 6,304,653 B1 | 10/2001 | O'Neil et al. | |
| 6,304,858 B1 | 10/2001 | Mosler et al. | |
| 6,321,212 B1 | 11/2001 | Lange | |
| 6,327,591 B1 * | 12/2001 | Osborn et al. | 707/10 |
| 6,338,047 B1 | 1/2002 | Wallman | |
| 6,393,409 B2 | 5/2002 | Young et al. | |
| 6,405,179 B1 | 6/2002 | Rebane | |
| 6,415,267 B1 | 7/2002 | Hagan | |
| 6,418,419 B1 | 7/2002 | Nieboer et al. | |
| 6,430,545 B1 | 8/2002 | Honarvar et al. | |
| 6,456,983 B1 | 9/2002 | Keyes et al. | |
| 6,480,850 B1 | 11/2002 | Veldhuisen | |
| 6,513,019 B2 | 1/2003 | Lewis | |
| 6,553,113 B1 | 4/2003 | Dhir et al. | |
| 6,578,015 B1 | 6/2003 | Haseltine et al. | |
| 6,658,393 B1 | 12/2003 | Basch et al. | |
| 6,745,229 B1 * | 6/2004 | Gobin et al. | 709/206 |
| 6,792,431 B2 * | 9/2004 | Tamboli et al. | 707/102 |
| 6,804,346 B1 | 10/2004 | Mewhinney | |
| 2001/0018674 A1 * | 8/2001 | Schein et al. | 705/35 |

| | | |
|---|---|---|
| 2001/0032158 A1 | 10/2001 | Starkman |
| 2001/0032159 A1 | 10/2001 | Starkman |
| 2001/0032176 A1 | 10/2001 | Starkman |
| 2001/0034682 A1 | 10/2001 | Knight et al. |
| 2001/0042034 A1 | 11/2001 | Elliott |
| 2001/0044293 A1 | 11/2001 | Morgan |
| 2001/0047489 A1 | 11/2001 | Ito et al. |
| 2001/0056390 A1 | 12/2001 | Varadarajan et al. |
| 2002/0026394 A1 | 2/2002 | Savage et al. |
| 2002/0038309 A1 * | 3/2002 | Perkins et al. ........... 707/104.1 |
| 2002/0059141 A1 | 5/2002 | Davies et al. |
| 2002/0133368 A1 * | 9/2002 | Strutt et al. .................... 705/1 |
| 2002/0194126 A1 | 12/2002 | Randell et al. |
| 2003/0004822 A1 * | 1/2003 | Shorter et al. ................. 705/26 |
| 2003/0101119 A1 | 5/2003 | Persons et al. |
| 2003/0163403 A1 | 8/2003 | Chen et al. |
| 2003/0208441 A1 | 11/2003 | Poplawski et al. |

FOREIGN PATENT DOCUMENTS

| WO | WO 01/86524 | 11/2001 |
|---|---|---|

OTHER PUBLICATIONS

Global Corruption Report 2004, Transparency International, Pluto Press, www.globalcorrupt, ISBN 07453 2231, Jun. 26, 2005.

Rial, Astrid, How to Monitor Collectors, Credit Card Management, Jul. 2000, vol. 13, Iss. 3:p. 65, 4 pages.

Keep the Change Savings Service, Bank of America, Retrieved from the internet on Jan. 27, 2006 at <https://www.bankofamerica.com/deposits/checksave/apps/ktc/ktc_terms.cfm>.

Computer Telephony Solutions, The Customer Interaction Specialists, Computer Telephony Solutions, Internet, May 25, 1999.

* cited by examiner

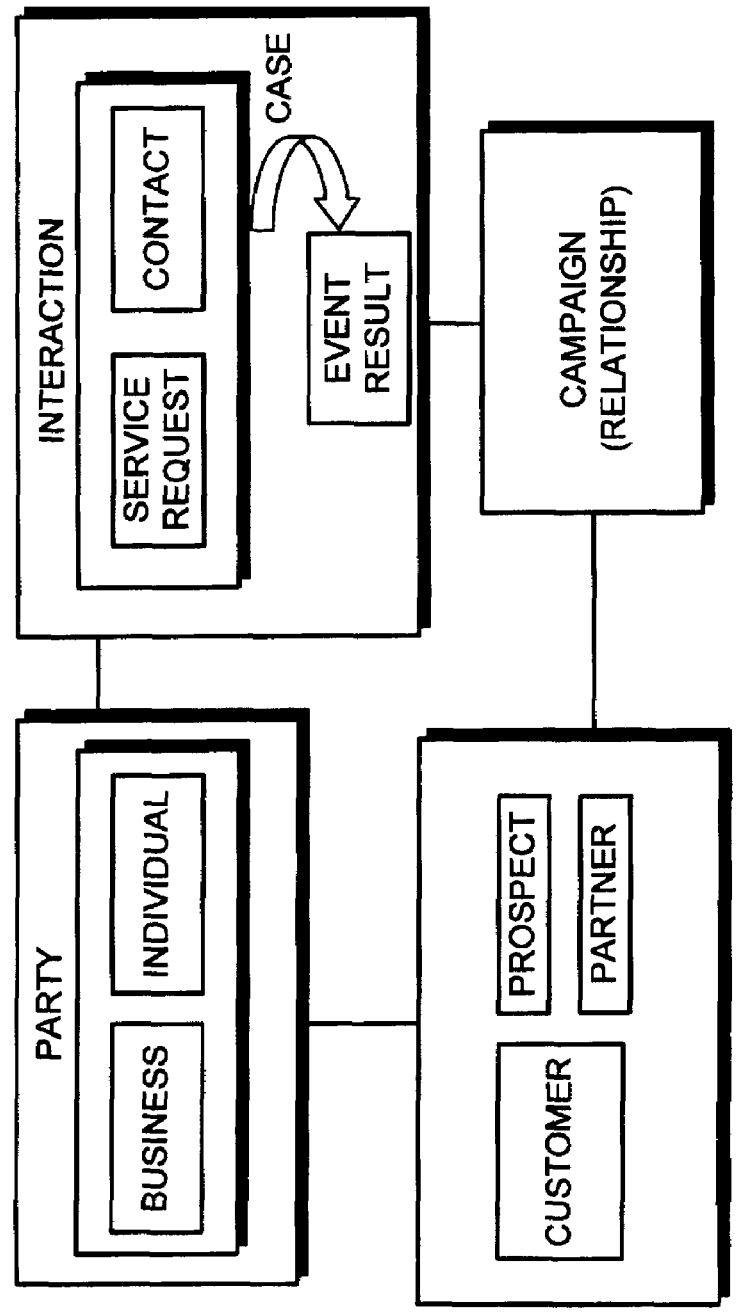
FIG. 3.0

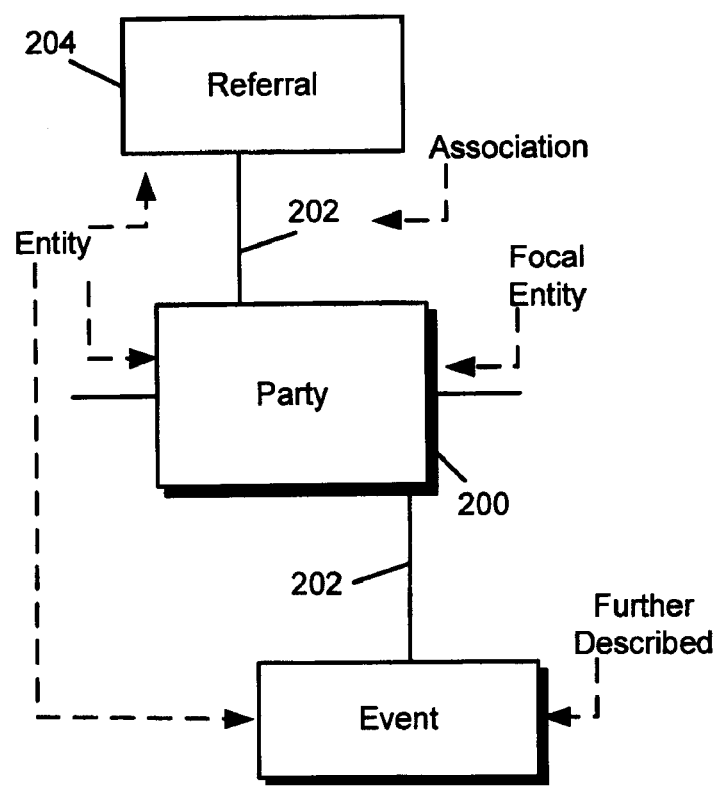
FIG. 3.1

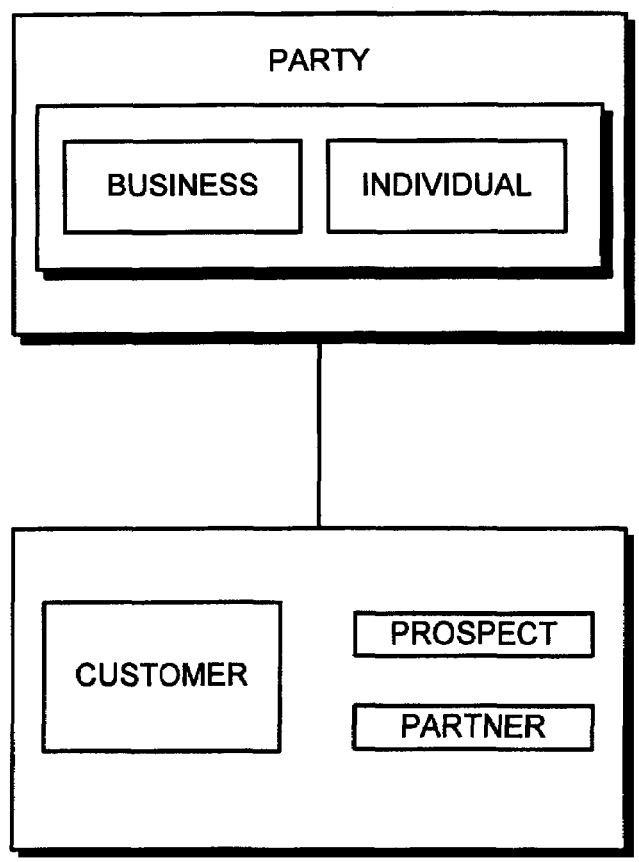
FIG. 3.2

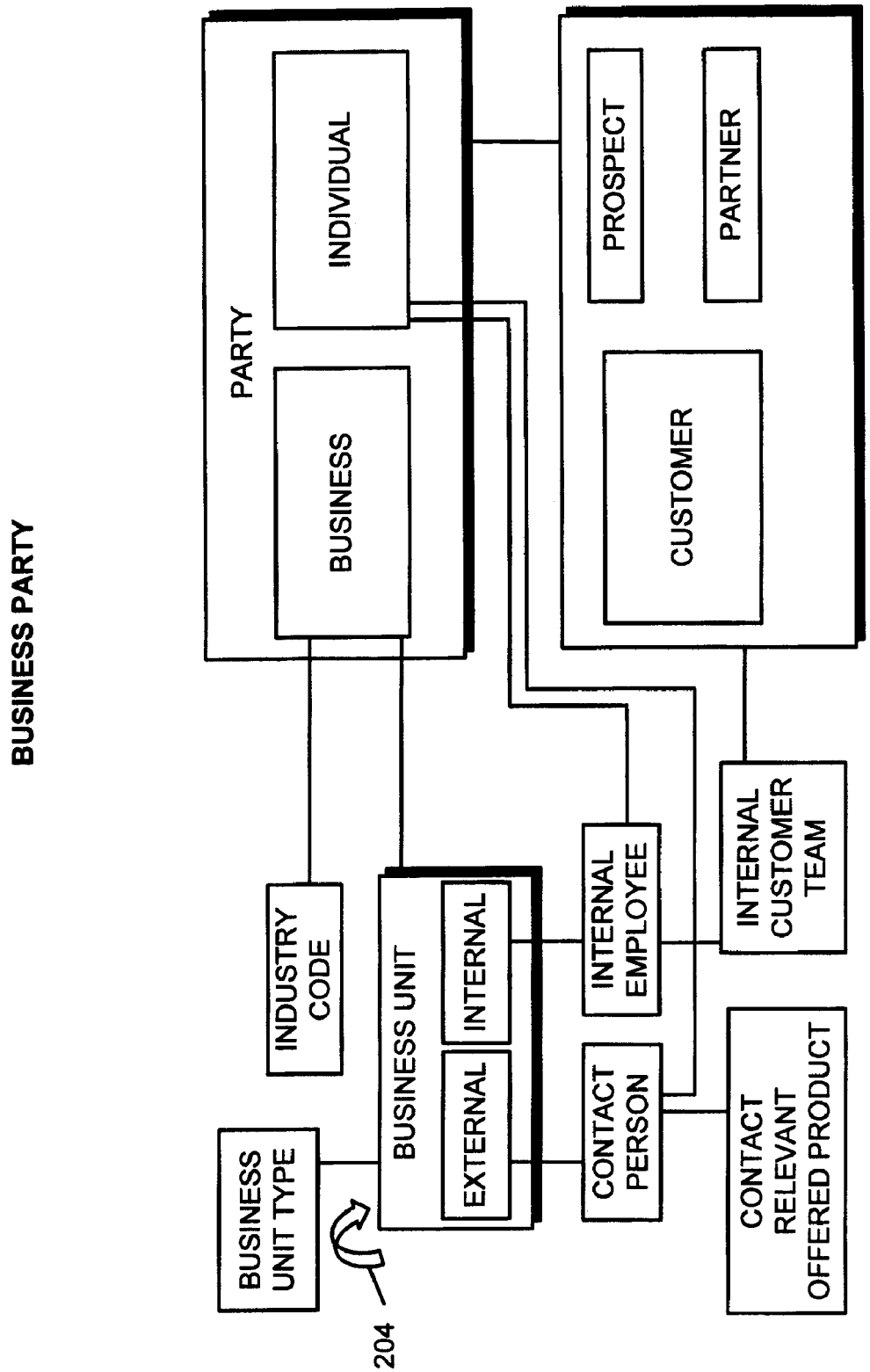
FIG. 3.2.1

INDIVIDUAL PARTY
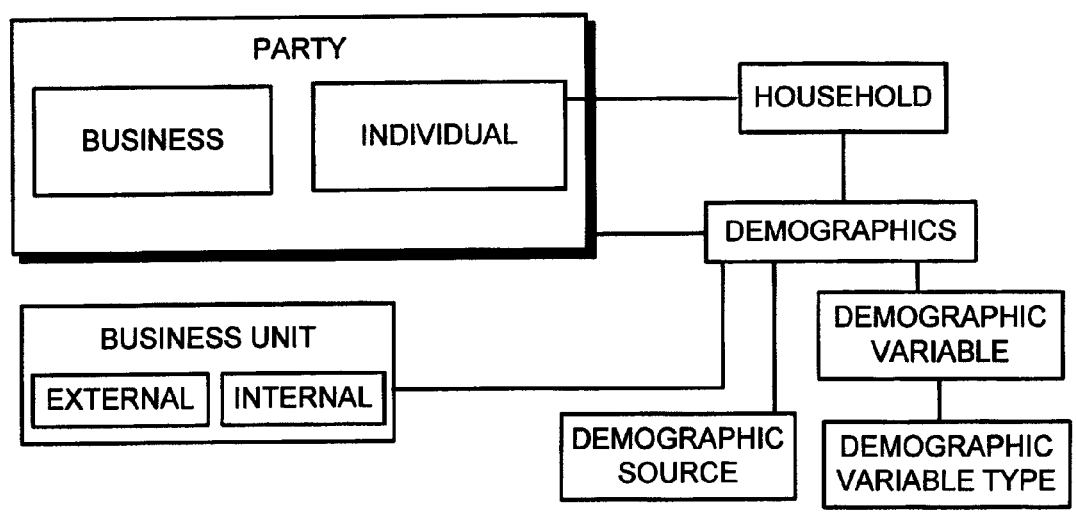
FIG. 3.2.2

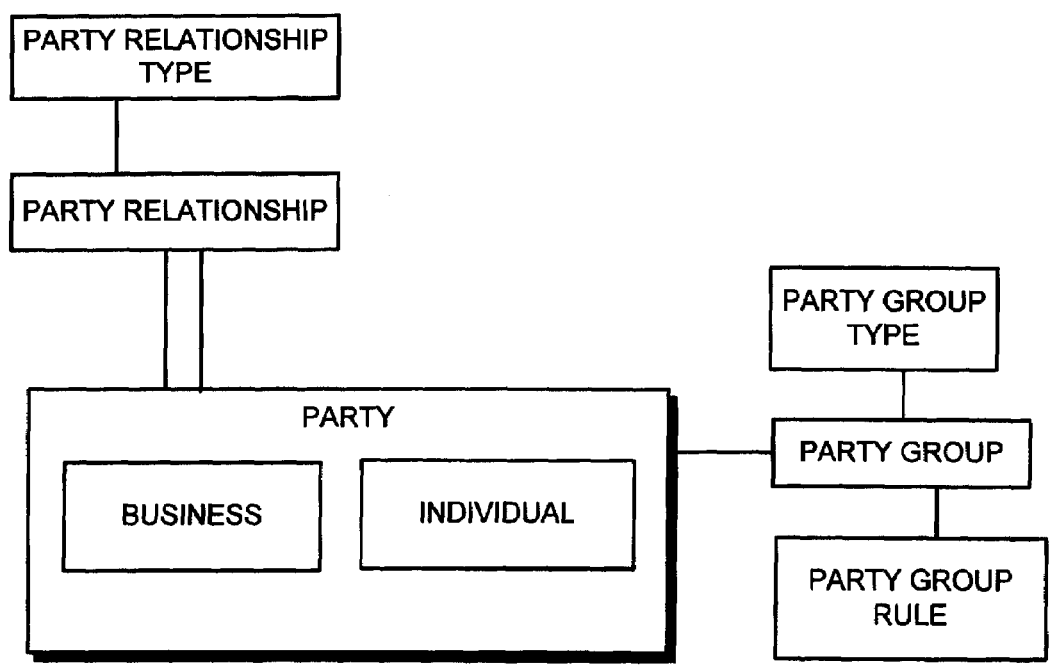
FIG. 3.2.3

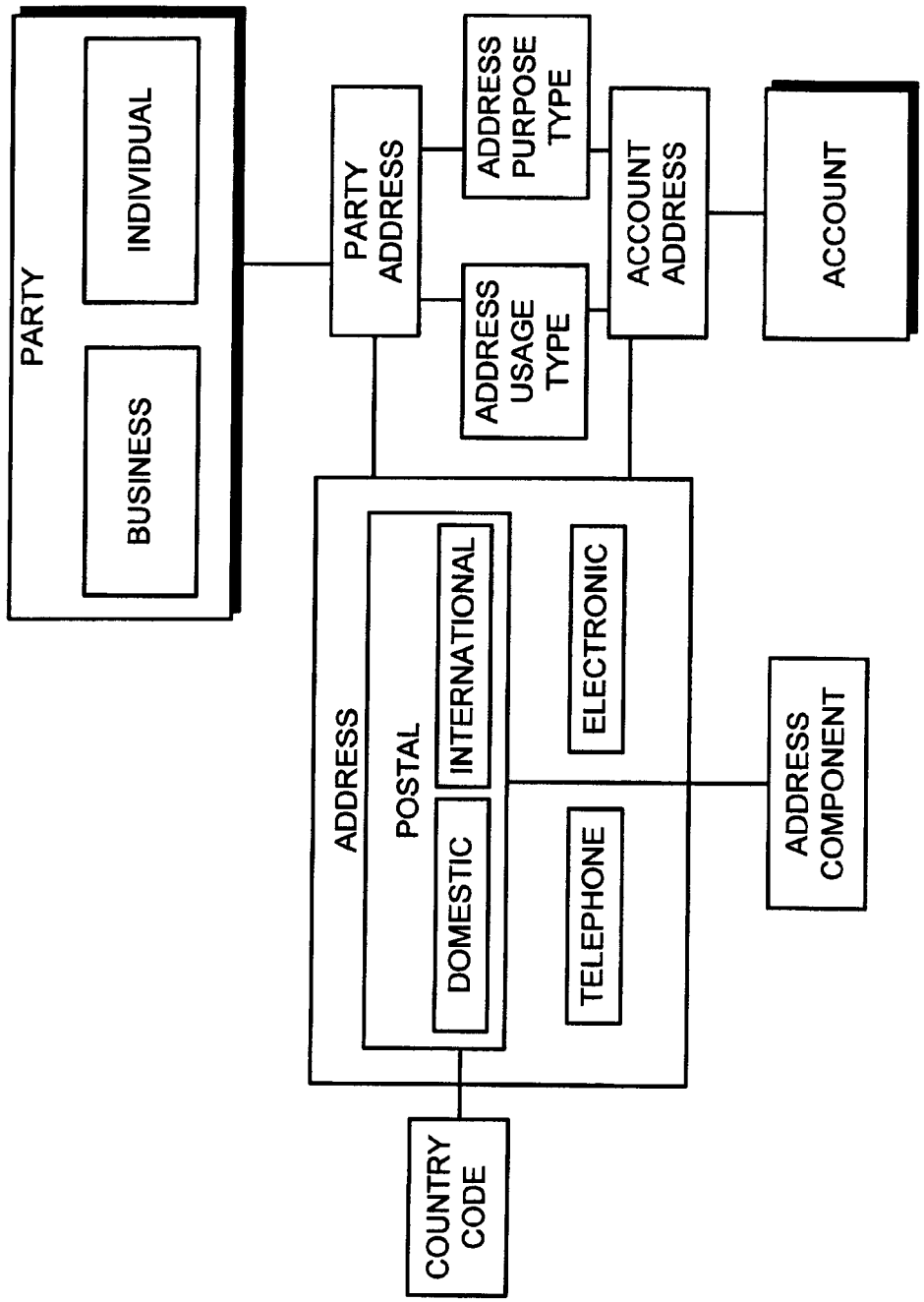
FIG. 3.2.4

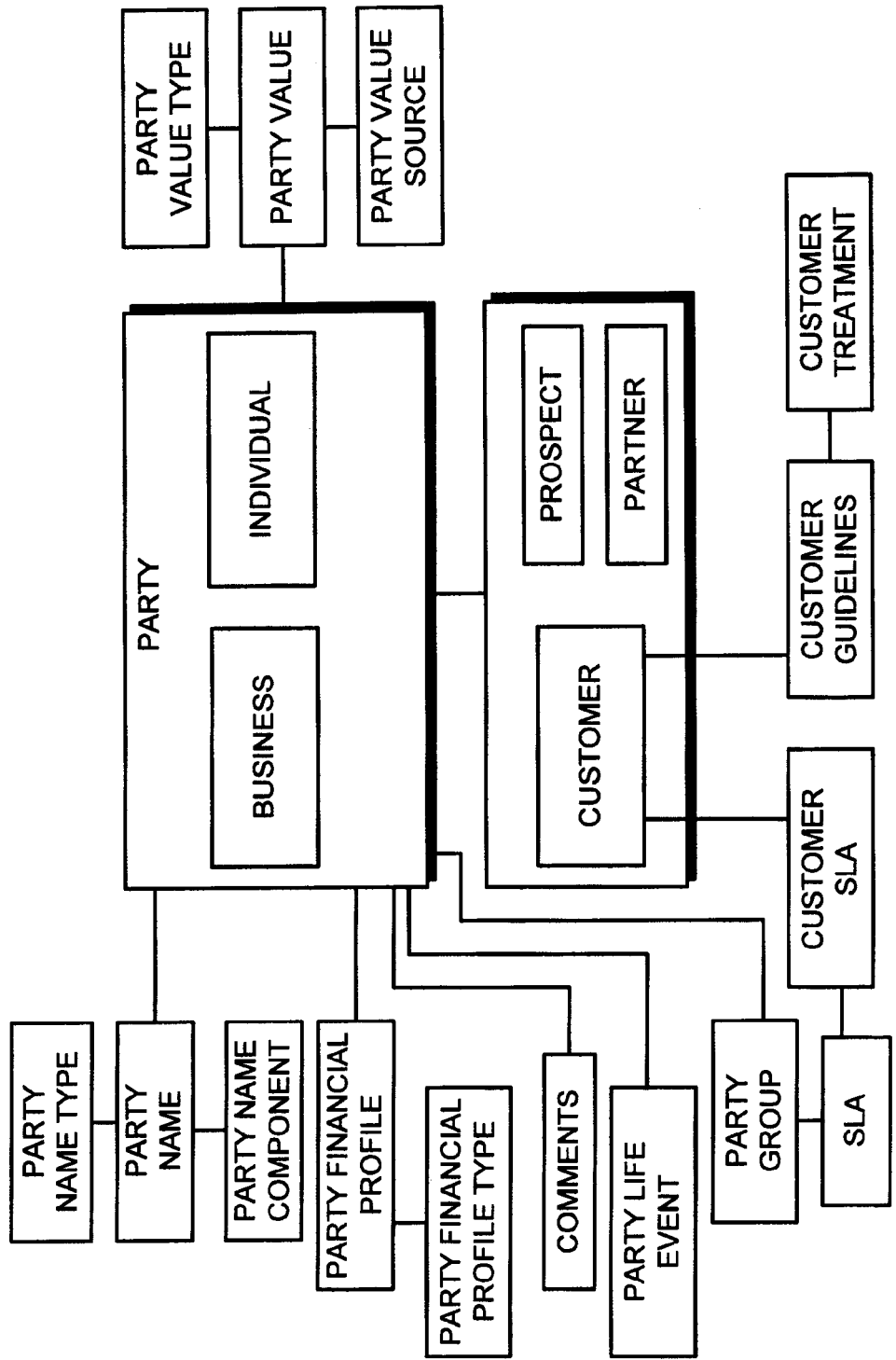
FIG. 3.2.5

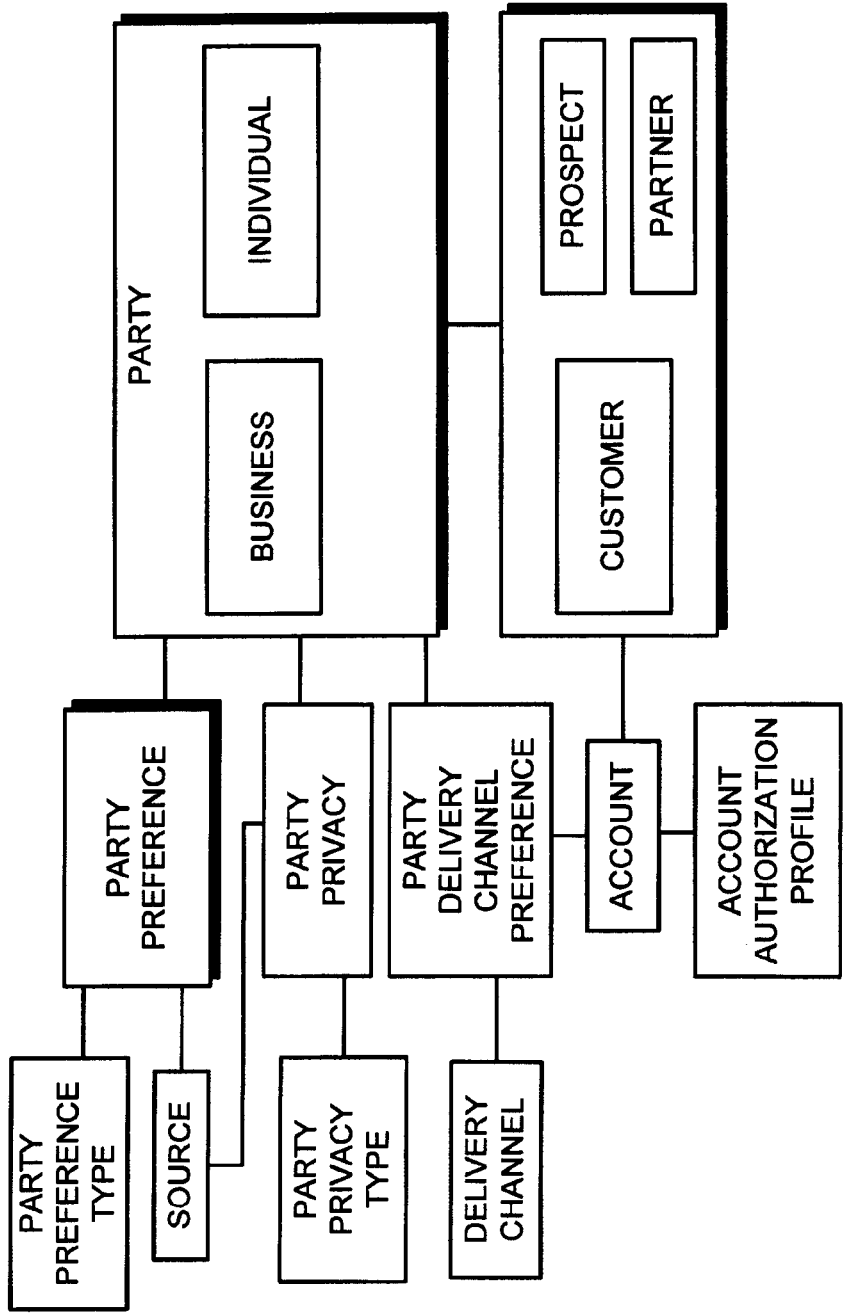
FIG. 3.2.6

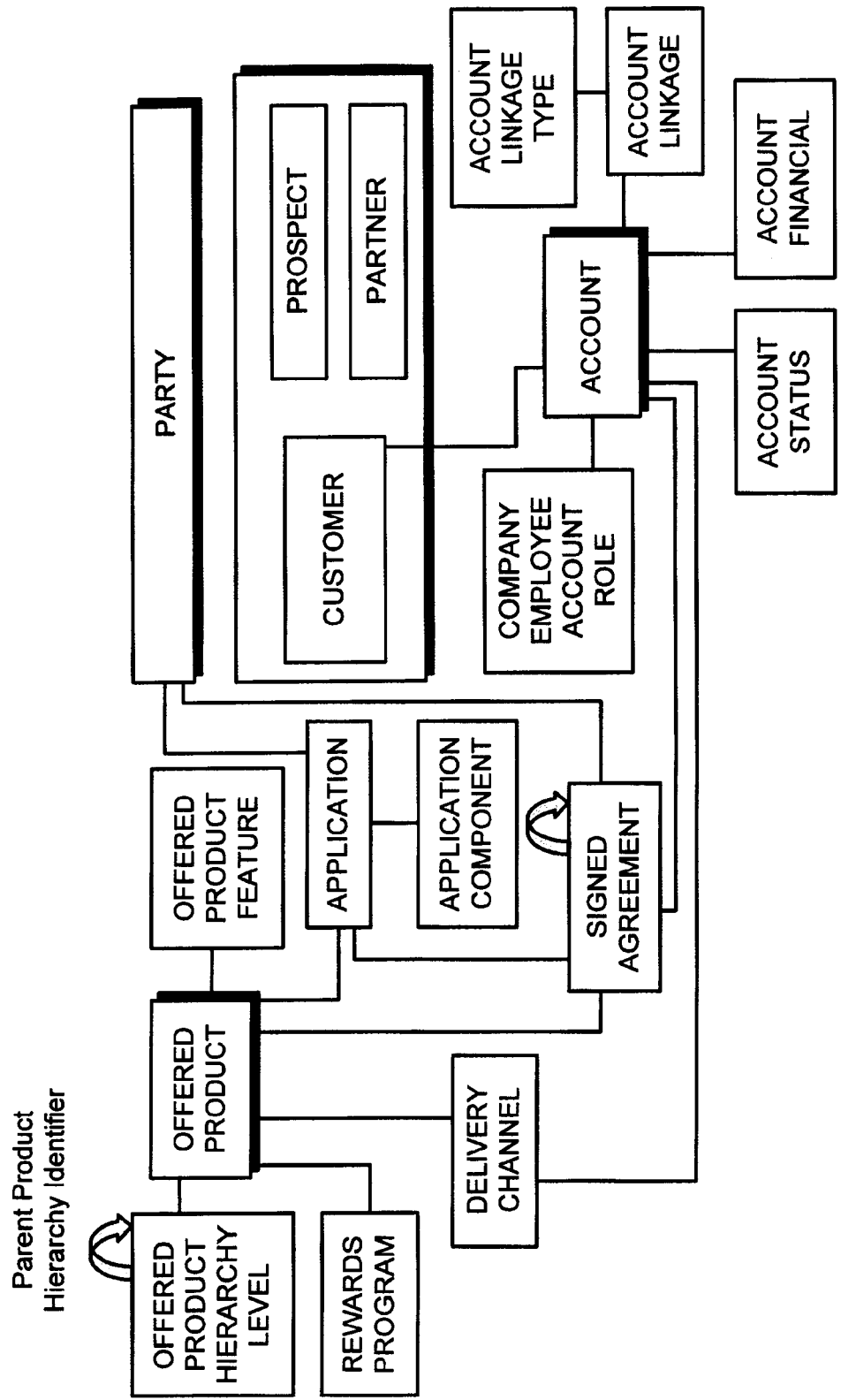
FIG. 3.3

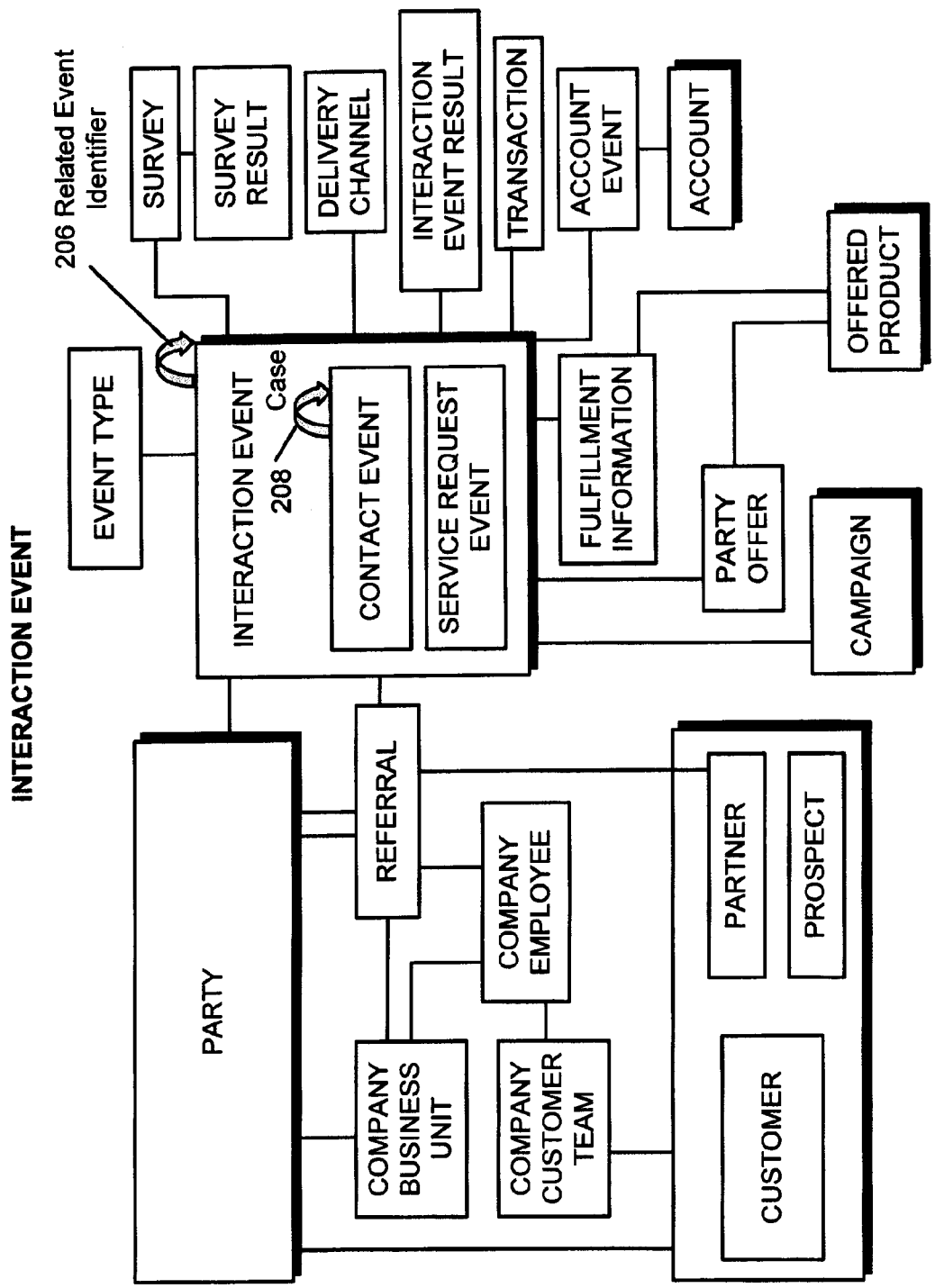
FIG. 3.4

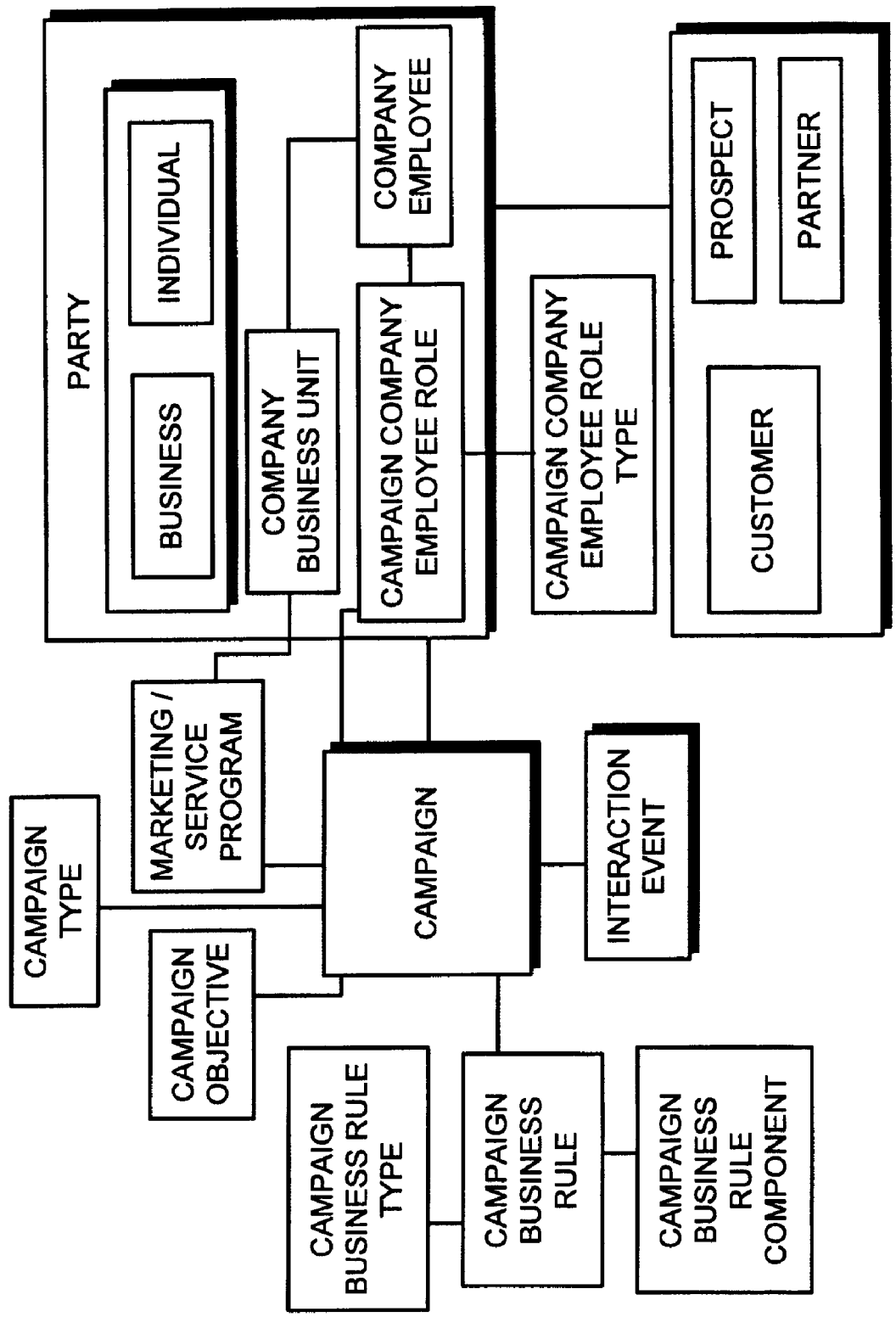
FIG. 3.5

CUSTOMER INFORMATION MANAGEMENT SYSTEM AND METHOD

CROSS REFERENCE TO RELATED APPLICATIONS

This application claims priority to provisional application No. 60/354,809, filed Feb. 6, 2002, the entirety of which is hereby incorporated by reference.

FIELD OF THE INVENTION

The invention relates to a customer information management system and, more particularly, to a customer information management system which allows a company to utilize information obtained across a plurality of lines of business.

BACKGROUND OF THE INVENTION

As a company grows and acquires or produces a plurality of lines of business, it becomes desirable to integrate the operations of those lines of business so that information can be shared and utilized more efficiently. If a company has lines of business in, for example, mortgage production and credit cards, it is advantageous for this company to be able to recognize its own credit card customer who may also now be interested in a mortgage.

The term "line of business" is intended to also include, optionally, portions of a company which may not be a core line of business but which has maintained a database of information separate from other portions of the company and the lines of business. This includes, for example, legal, administrative and other supervisory portions of the company.

Some prior art techniques for integrating portions of a company include simple requirements that the company use the same operating system on its computers or the same word-processing program throughout. Other integration techniques relate to the technology shared across the company. However, such minimal integration techniques, while allowing the company to operate somewhat more efficiently, do not necessarily allow the company to share information from one line of business to another. In some cases, lines of business and their respective databases become so segregated that each line of business almost becomes a company by itself and thereby gives the impression to customers that a plurality of companies exist—instead of a single company with a plurality of lines of business. For example, a customer may change his address with one line of business and expect that his address will be changed with all other lines of business within the same company (e.g. a change at JPMorganChase automotive should produce a change in JPMorganChase mortgage). Such conveniences, however, do not always occur. Additionally, if a customer indicates certain preferences to one line of business (e.g. best contact information), that information should be shared among all other lines of business. Again, this does not always occur.

One problem is that lines of business often provide such differing services that eventually each line of business develops its own language or definitions for certain terms. For example, the term "prospect" in one line of business may mean someone who the company has contacted, whereas the same term in another line of business may mean someone that the company has never contacted but would like to contact.

There are frequently different types of customer management technologies across lines of business even for similar business functions. Data for customers is stored in a plurality of locations for a plurality of lines of business. However, this data is typically not shared among the lines of business.

Data for each line of business is typically specific for the line of business and few software applications are common across lines of business. Some information is shared while other information is not. Multiple customer information profiles exist across lines of business thereby making it difficult to get a single view of customer profiles and behavior. Obtaining cross line of business information is also difficult because of poor data quality enforcement, different systems, and different hardware, database applications.

An example of a prior art customer information management system exhibiting some of the above discussed problems is shown in FIG. 1. In customer information management system 50, a customer 70 communicates through channels 52 to a company 68. Channels 52 may include, for example, an automated teller machine, 54, phone 56, internet 58, a branch 62 of company 68 or through other means 60. Customer 70 may seek to access or do business with one of a plurality of lines of business 86, 88, 90, 92 or 94. These lines of business may classify data in different formats in that, for example, similar terms may have different meanings or different fields may store similar data. Customer 70 communicates through one of the channels 52 and the communication is conveyed through a messaging bus 64 to the applicable line of business. Examples of lines of business include credit card services, mortgage services, automobile loans, etc. Each line of business includes an associated database 96, 98, 100, 102, 104. As customer 70 deals with company 68 and a particular line of business, information about the customer himself and about his transactions are stored in the applicable database 96, 98, 100, 102, 104. Some common data may be stored in an information warehouse 122. Such common data is only scant details about customers and is usually weeks old before it can be compiled and processed. An administrative portion 82 of company 68 also compiles information about customer 70 in a database 84. The term "line of business" will therefore include administrative portion 82 as discussed above.

For example, customer 70 may have a credit card through line of business 86. Over time, customer 70 will have many communications with line of business 86 and information about customer 70 and his account will be stored in database 96. Line of business 88 may offer mortgages and it would be useful for it to have information about customer 70 so that customer 70 could be contacted regarding mortgage information. Similarly, customer 70 may have an automobile loan through line of business 90. If customer 70 contacts line of business 86 and indicates that his address has changed, it would be desirable if line of business 90 is advised of this change. The customer may only be aware of the existence of company 68 and not interested in contacting all lines of business regarding his change of address.

Historically, databases 96, 98, 100, 102, 104 and 84 maintained by the separate lines of business 86-94 and 82 have been designed very differently or at least have been designed without regard to each other. The fields in each of these databases are not necessarily the same. A field for a social security number, for example, may be very important for one line of business and may have its own designated field; whereas the use for a social security number in another line of business may have evolved and may be merely entered in an extra auxiliary field. Even terms used in the databases may mean different things. The example discussed above regarding the term "Prospect" illustrates some of the confusion which may arise.

The different structuring of databases 96, 98, 100, 102, 104 and 84 makes it very difficult for lines of business 86, 88, 90, 92, 94 and 82 to communicate with each other and share information.

Additionally, information about customer 70 (or about a plurality of customers) which may be gleaned across databases 96, 98, 100, 102, 104 and 84 is not available because it is very difficult to gather information from all of these databases due to the problems discussed above. Even administrative portions 82 of company 68 which customer 70 may not have direct contact with (such as, for example, legal, research and development, etc.) may have to populate their databases 84 independently of databases 96, 98, 100, 102 and 104 because of this inability to share information and, conversely, other lines of business 86, 88, 90, 92, 94 cannot easily benefit from this information.

As indicated above, similar information may be stored in different fields or similar terms may have different meanings across lines of business. Although desirable, it is generally difficult to get lines of business to agree on terminology which can be used across the lines of business. As these lines of business have difficulty even agreeing on terminology, it is very difficult to revamp each database individually so that it conforms to a standard throughout company 68.

Thus, there is a need in the art for a system and method which can integrate the information available across lines of business so as to enhance the operation and communication in a company. Such a system should provide a centralized database including general information about customers acquired across lines of business and allow lines of business to benefit from data stored in other lines of business.

BRIEF DESCRIPTION OF THE DRAWINGS

FIGS. 3.0-3.5 show logical data relationships of terms used in a customer information model of the invention.

SUMMARY OF THE INVENTION

A customer information management system which enables integration of data across lines of business that classify data using distinct formats. In the system, a plurality of lines of business are in communication with one another and with a customer server. A customer information model produces a common classification format used by the customer server. Adapters at each line of business translate information between the format used by the customer server and the format used by the respective line of business. In use, the customer server may glean information from all of the lines of business and produce detailed data stores about customers. A first line of business may also obtain information from a second line of business by making a request through the customer server.

DETAILED DESCRIPTION OF THE PREFERRED EMBODIMENT(S)

Figure 1:
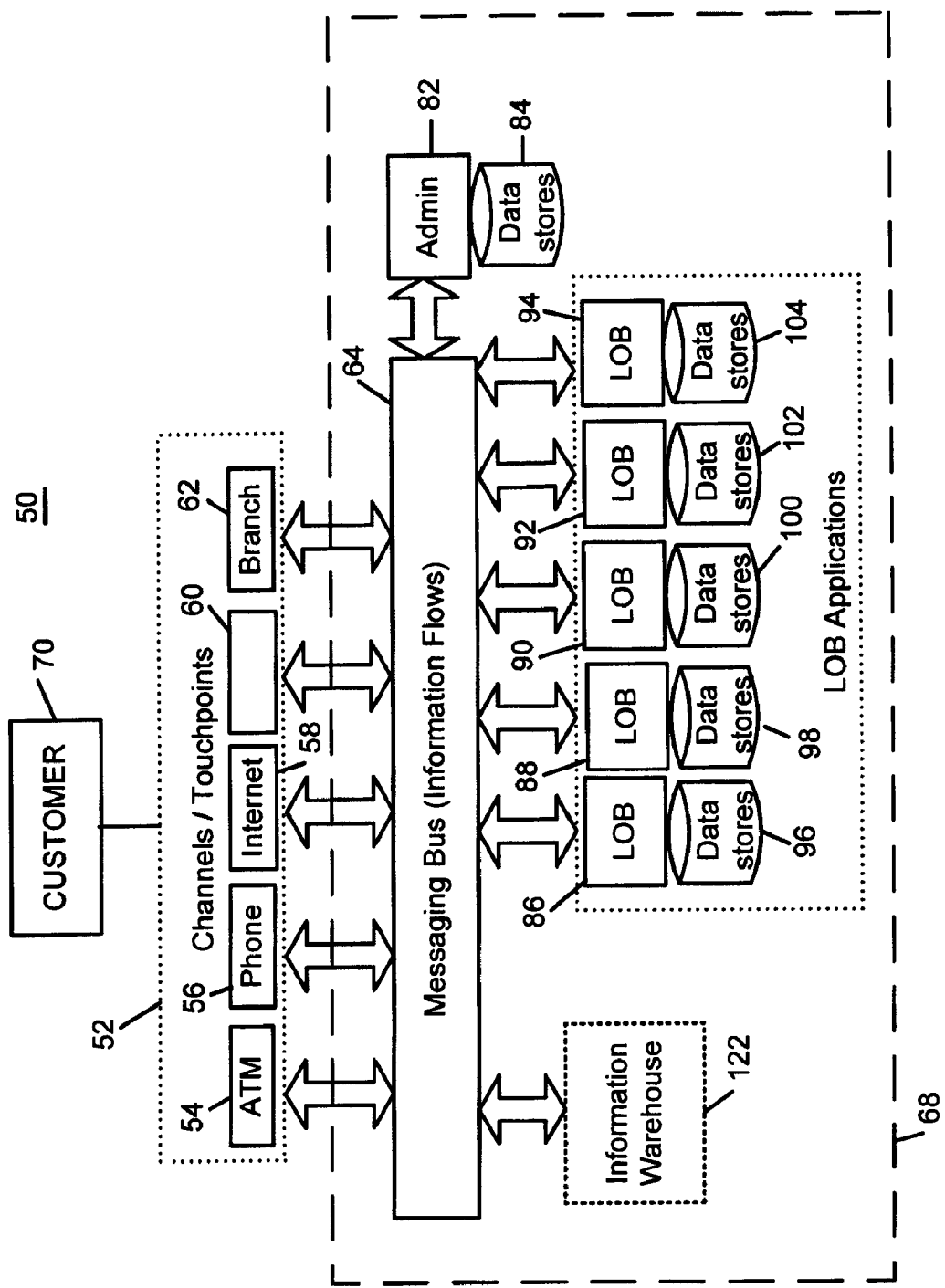
FIG. 1 is a system view of a prior art customer information management system.
Figure 2:
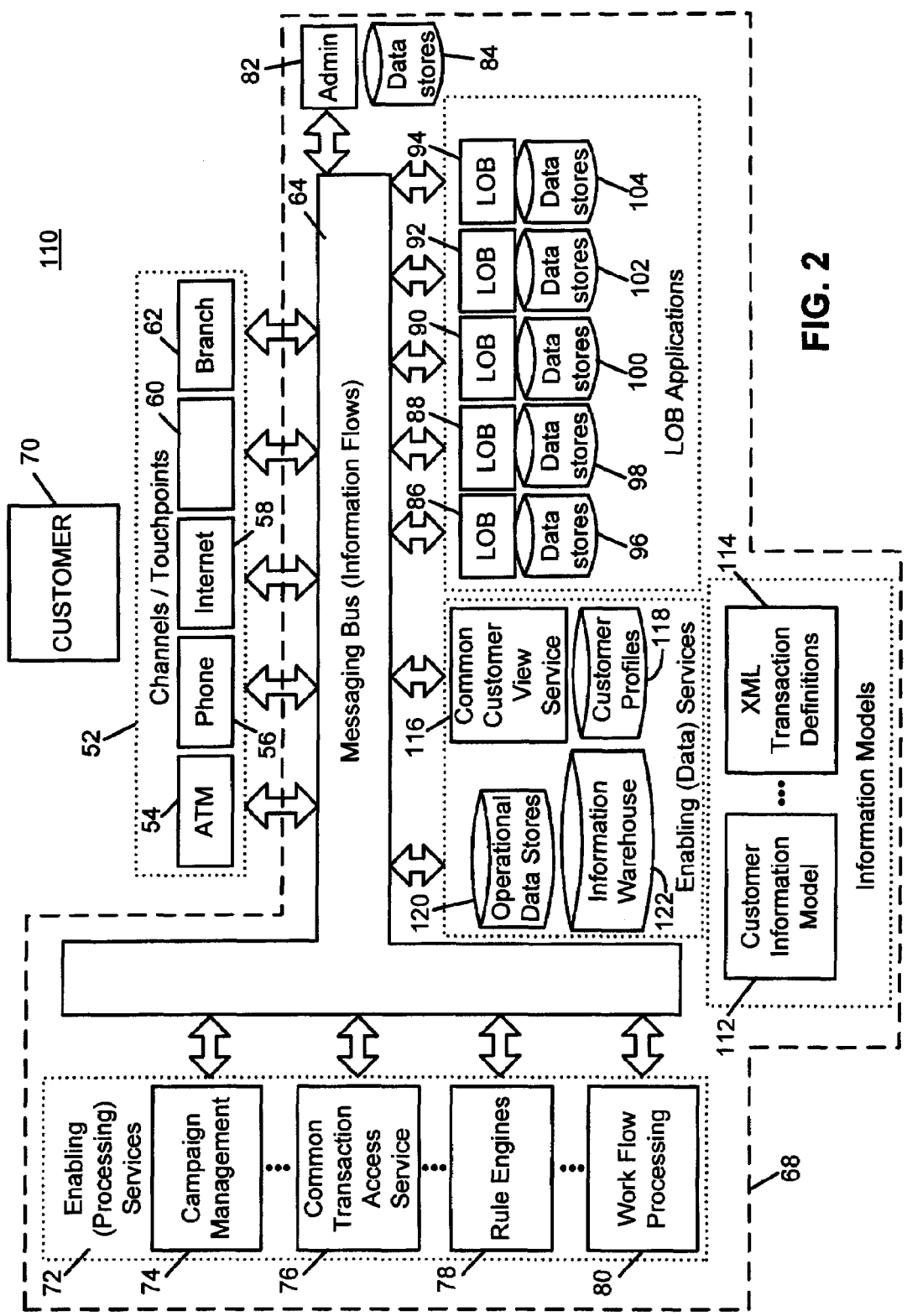
FIG. 2 is a system view of a customer information management system in accordance with the invention.

Referring to FIG. 2, there is shown a customer information management system 110 in accordance with the invention. As with prior art customer information management system 50, customer 70 communicates with lines of business 86, 88, 90, 92, 94, 82 of company 68 through channels 52. In contrast to prior art system 50, each line of business 96, 98, 100, 102, 104, 82 can communicate with each other and benefit from information stored by other lines of business effectively because of, in part, the provision of a customer information model 112. By integrating the data stored in databases 96, 98, 100, 102, 104 and 84, customer information model 112 enables the creation of centralized enabling services 72, a central customer server 115 and common customer view service 116. Enabling services 72 include campaign management 74, common transaction access service 76, rule engines 78, and work flow processing 80. Campaign management 74 defines and manages product or service campaign offers. Common transaction service 76 coordinates financial and/or customer transaction data from a plurality of systems. Rules engine 78 tracks customer habits and applies particular rules when certain events are triggered. Work flow processing 80 handles the processing of a request so that an action request will happen. These enabling services 72 can be centralized and need not be duplicated in every line of business.

Common customer view service 116 maintains sources of customer information, maintains business rules for managing data integrity, tracks selected customer information requests from lines of business, manages update requests for information, manages data aggregation for selected customer activity, and ensures data integrity among the databases. Clearly not all of these functions need to be performed by a single device or at a single location. Customer information model 112 also enables the creation of customer profiles 118 which may include customer preferences, and key customer activity. Other operational data stores 120 are also enabled and which may manage customer information stored across lines of business. Information warehouse 122 is also enabled.

An example of customer Information Model 112 in accordance with the invention, is depicted in FIGS. 3.0-3.5. By providing a single model used throughout company 68, information in databases 96, 98, 100, 102, 104, 84 can be shared as explained below. Customer information model 112 represents a customer view of information supporting processes which customer sees. The model has depth for this purpose, i.e. it is an enterprise customer model for relationship management with Company 68. The model comprises these major subject areas: Party, Interaction Event, and Campaign as shown in FIG. 3.0.

"PARTY" is all the descriptive information about a customer. It includes name and addresses, financial profile, preference—personalization profiles, as well as demographics and other information that provides insight into individual customers as well as segments or groups of customers. Model 112 also includes information to support focusing on customer service differentiation through guidelines, treatments, and service levels.

"INTERACTION" is the area of the model that captures the business information structures involved in understanding interactions between a PARTY/CUSTOMER and company

68. INTERACTION EVENTS can be inbound (i.e. initiated by the customer/party) or outbound (i.e. initiated by company 68). INTERACTION EVENTS can be SERVICE REQUESTS (such as a request for an increase in a credit line or a deposit) and may result in a transaction that records an activity for an account. INTERACTION EVENTS can also be CONTACT EVENTS, such as responding to customer queries, soliciting customer feedback, dialoguing with a customer regarding needs, or making an offer to a customer.

CAMPAIGN is the area of the model that is focused on understanding those aspects of CAMPAIGNS that will enable company 68 to better integrate campaigns across lines of business and offer the most relevant opportunities to the customer. The model supports a closed loop marketing process and incorporates the concepts of building relationships with individual customers through one to one marketing and dynamic offers.

The model is more formally documented using the Chen Entity Relationship Technique in the ERWIN tool. However, it should be noted that neither representation is intended to represent a full logical model to support physical data base design activities for an application. Rather model 112 is a business semantics model. As projects go forward using this model as a base, this business semantics model will evolve into a technically robust model to support development-engineering activities.

The discussion of each area of the model is accompanied by a set of diagrams that follow the structure shown in FIG. 3.1

Each box represents an ENTITY. An ENTITY, such as PARTY 200, is a person, place, thing, concept or event that has lasting interest, can be uniquely identified, and that can have data about it stored. Entities are frequently referred to as an information object. Entities in shadowed boxes (such as PARTY) are Focal Entities. They are the major construct for a subject area. Other entities extend the meaning and context of the focal entity.

Solid lines 202 between entities represent a Relationship. Relationships are associations between two entities that the business 68 should retain. The association between the entities is described with a verb. For example, A PARTY 200 makes 202 a REFERRAL 204. The details beneath the model enable us to show that we can capture which PARTY made the REFERRAL, which PARTY was referred, which PARTY received the REFERRAL, and when the REFERRAL occurred.

The model employs several techniques to capture business information semantics with flexibility. For example, the model uses typing to classify information entities. This enables modeling needs in a more generic manner as opposed to explicitly modeling every construct without losing the ability to capture specificity found in explicit models.

The identification of Primary Keys(PK) is predominately based on the concept of system generated unique numbers as opposed to natural keys. Identifying relationships between entities that are typed and their corresponding type entity causes the migration of the PK of the type entity to the PK of its associated entity. However, this creates an 'unnecessary' attribute in the PK. As a result, a technique was used to define these relationships as non-identifying but not permit nulls in the type attribute. This preserves the typing while maintaining a simplistic, unique key. However, in reading ERWIN generated relationship reports, type entities are presented as optional.

The heart of the Customer Information Model is the Focal Entity PARTY as illustrated in FIG. 3.2. PARTY is a legal entity or an individual, with which company of 68 or any one of its subsidiaries has done, is currently doing, or plans to do business with. PARTY includes company 68, one of its subsidiaries, or one of its employees.

PARTY is classified as either:
BUSINESS PARTY: a type of a PARTY that is a business or an organization, public or private. E.g., IBM, US FEDERAL RESERVE, JPMORGANCHASE or INDIVIDUAL PARTY: a person, e.g., John Doe.

A PARTY can interact with company 68 in one of several roles, each role having specific information that is of value to the business. Roles include:
CUSTOMER: is an individual or business for whom company 68 is currently providing product, i.e., the individual or business has an ACCOUNT with an open status or an ACCOUNT with a closed status and a balance greater than $0. Memory of customer (history) is important.
PARTNER: a type of BUSINESS PARTY that engages directly with company 68 in offering and/or delivering products and services. E.g., FREEHOLD CHEVROLET, SUBARU (manufacturer). PARTNER TYPE classifies the form of the business activity of a PARTNER. Examples include Mortgage Broker, Auto Dealer. Products and services include company 68 OFFERED PRODUCTs as well as a PARTNER's OFFERED PRODUCTS.
PROSPECT: a Party whom company 68 considers to be a potential Customer, i.e., an INDIVIDUAL or BUSINESS whom company 68 could provide product/service.

There are a several concepts about BUSINESS PARTIES that are of interest to the business as illustrated in FIG. 3.2.1

One can classify a BUSINESS PARTY by one or more INDUSTRY CODEs which is a Standard Industry Classification (SIC) code that identifies a business activity of a BUSINESS PARTY. Examples include 541110 (Offices of Lawyers), 522110 (Commercial Banking).

As industry classifications can be obtained from more than one organization, INDUSTRY CODE SOURCE identifies the governmental standards organization maintaining the industry classification, e.g., Office of Management and Budget (OMB) which maintains NAICS (North American Industry Classification System).

BUSINESS PARTIES, including company 68, frequently have an internal organization structure, (illustrated by the curved arrow 204), that is of interest to the business. The BUSINESS UNIT entity describes the organizational unit of a BUSINESS PARTY, including company 68 and identifies its parent BUSINESS UNIT, i.e., the next level up in a hierarchy that the BUSINESS UNIT is part of. If the BUSINESS UNIT does not have a parent BUSINESS UNIT, the PARENT BUSINESS PARTY BUSINESS UNIT Identifier attribute is null. For example, Chase Auto Finance is a BUSINESS UNIT within JPMORGAN CHASE and its parent Business Unit is CHASE FINANCIAL SERVICES. Each BUSINESS UNIT can be classified by BUSINESS UNIT TYPE such as Division, Department, or line of business. For example, Chase Auto Finance is a line of business.

BUSINESS UNITS are classified as EXTERNAL or Internal. For EXTERNAL BUSINESS UNITS, it is important to understand who is a CONTACT PERSON, i.e., an individual representative for an EXTERNAL BUSINESS PARTY designated to perform a role for that BUSINESS PARTY. For example, John Smith, (who is a Party), is the Treasurer (for Business Party Smith & Co.). It is also important to understand what CONTACT RELEVANT OFFERED PRODUCTs are of interest to a CONTACT.

It is desirable to understand which PARTYs are company internal EMPLOYEEs and the BUSINESS UNIT they work for.

An internal CUSTOMER TEAM is a group of internal EMPLOYEEs that provide sales and services to customers and prospects. A BUSINESS UNIT is responsible for a JPMC CUSTOMER TEAM EMPLOYEE ROLE TYPE and describes each CUSTOMER TEAM of company 68 and each role that an EMPLOYEE plays on a CUSTOMER TEAM.

Referring to FIG. 3.2.2, a HOUSEHOLD is a collection of INDIVIDUAL PARTIES that reside at the same dwelling. HOUSEHOLD is a grouping of PARTYs provided by an external third party. HOUSEHOLD may be used as a mechanism to better understand common characteristics and to derive PARTY Relationships. But it is not synonymous with PARTY Relationship.

DEMOGRAPHICS are a set of characteristics associated with a PARTY and/or HOUSEHOLD and can be associated with PARTIES in the HOUSEHOLD. Examples of DEMOGRAPHICS include age, household income, and highest education level. DEMOGRAPHICS also are relevant to a BUSINESS PARTY although the characteristics may be quite different. For example, instead of 'household income', the average annual revenue or net income may be more appropriate variables of interest.

As DEMOGRAPHICS are about a collection of characteristics, it is useful to model DEMOGRAPHICS as containing one or more DEMOGRAPHIC VARIABLEs, i.e., is one or more elements describing a PARTY or HOUSEHOLD such as household income. Modeling DEMOGRAPHICS in this manner provides a flexible structure. Instead of limiting data to a single set of elements, the model supports any number of elements to be captured without modifying the structure. DEMOGRAPHIC VARIABLE TYPE uniquely classifies a DEMOGRAPHIC VARIABLE. This enables labeling the DEMOGRAPHIC VARIABLE to understand what the content represents, e.g., household income, highest level of education; average annual revenue as well as its physical characteristics, i.e., data type and length.

As DEMOGRAPHICS can be collected from a variety of sources, DEMOGRAPHIC SOURCE identifies who provided the DEMOGRAPHICS. Examples include external providers such as AXCIOM or the CUSTOMER/PARTY may provide the demographics directly.

The relationship line between DEMOGRAPHICS and COMPANY BUSINESS UNIT defines which COMPANY BUSINESS UNIT owns the DEMOGRAPHICS and which COMPANY BUSINESS UNIT(S) use them.

In addition to understanding characteristics of PARTYs and the roles they have with company 68, it is also important to understand how two or more parties relate to each other as illustrated in FIG. 3.2.3.

A PARTY GROUP is a number of PARTYs classified together for a specific purpose, e.g., PARTY GROUP TYPE classifies the basis for which PARTIES are grouped together. Examples of PARTY GROUP TYPE include segmentation and service differentiation. PARTY GROUP RULE describes the business rule for including a PARTY in a PARTY GROUP. For example, "PARTY must be a CUSTOMER and opened a new Account in the last 60 days". A PARTY GROUP can have a set of PARTY GROUP RULES defining its membership. Each PARTY GROUP RULE has a sequence number to indicate the ordering of PARTY GROUP RULES.

PARTY RELATIONSHIP is an affiliation between two PARTIES. It supports understanding the RELATIONSHIP between two individuals while PARTY RELATIONSHIP TYPE classifies the RELATIONSHIP defined in PARTY RELATIONSHIP. For example, PARTY RELATIONSHIP defines that Mary Smith is related to John Doe while PARTY RELATIONSHIP TYPE classifies that RELATIONSHIP, for example Spouse.

PARTY RELATIONSHIP also supports recording business RELATIONSHIPS between PARTIES. For example, John Doe is an INDIVIDUAL PARTY and is related to a BUSINESS PARTY Smith Enterprises. PARTY RELATIONSHIP TYPE in this case is 'Gemini Relationship'. Another example is an SBFS sibling relationship. For example, Business Party Smith Enterprises is related to BUSINESS PARTY Doe Incorporated.

Another example of PARTY RELATIONSHIP is Peter Smith is related to Robert Green and the PARTY RELATIONSHIP TYPE, attorney, defines that Peter Smith is the attorney for Robert Green.

Thus PARTY RELATIONSHIP enables the recognition of interrelationships between CUSTOMERS, PARTNERS, and PROSPECTS and enables company 68 to better determine the value of the RELATIONSHIP, potential expansion of RELATIONSHIPS, and differentiate service for high potential customers.

Communication with customers may occur any time, any place, using a wide range of communications and channels. Customers/PARTYs expect to be communicated with in a manner that is convenient for them.

The model 112 approaches PARTY ADDRESS with this as a backdrop. And the model for PARTY ADDRESS, as shown in FIG. 3.2.4 provides a robust and flexible structure for capturing multiple 'addresses' for a wide variety of communication channels. It also supports understanding how the PARTY prefers to be communicated with.

In model 112, ADDRESS is a means to deliver a communication, product, or service to a PARTY. The model supports multiple addresses for a Party and classifies an address as a POSTAL ADDRESS, TELEPHONE ADDRESS, or an ELECTRONIC ADDRESS.

A POSTAL ADDRESS is a particular type of ADDRESS that identifies the location for delivering something to a PARTY through the mail. A POSTAL ADDRESS is composed of multiple ADDRESS COMPONENTS. Examples include 125 Main Street (address line); Our Town (city), 10000-0001 (postal code). Thus a collection of ADDRESS COMPONENTS comprises an ADDRESS such as 100 Main Street, Our Town 10000-0001. ADDRESS COMPONENT TYPE classifies an ADDRESS COMPONENT according to the function it provides. Examples include address line; city; attention of; zip code.

POSTAL ADDRESS is classified as a DOMESTIC ADDRESS (an ADDRESS that is a US postal address) or an INTERNATIONAL ADDRESS (an ADDRESS that is an international postal address examples include: 64 Park Lane, London W1Y3TE; 17 rue Gros, Paris 75016.). COUNTRY CODE is the US Postal Country Code and the two letter International Standards Organization (ISO) code for identifying countries, e.g., BE (Belgium), US (United States). COUNTRY CODE indicates which country the address is associated with. STATE CODE is the two letter alphabetic code used by the US Postal Services to designate the state associated with a DOMESTIC ADDRESS. Examples include NY, NJ.

TELEPHONE ADDRESS contains a telephone number (domestic or international) for a PARTY. Examples include 212-555-1212; 01.44.96.30.30. Each portion of the TELEPHONE ADDRESS is modeled as an attribute, for example, Telephone Country Code, Telephone City Code.

ELECTRONIC ADDRESS is an ADDRESS used for electronic communication, such as e-mail address, web address, document URL, IP address of a device. Examples include jdoe@aol.com (Internet), http://chase.web.com/customer.asp (URL). ELECTRONIC ADDRESS TYPE classifies an ELECTRONIC ADDRESS to indicate the specific kind of ELECTRONIC ADDRESS, e.g., E-mail address, document URL, IP address of a device.

An ACCOUNT ADDRESS is a PARTY ADDRESS used in conjunction with a specific ACCOUNT.

In addition to supporting multiple addresses and multiple address types, the model also enables specifying usage and purpose. ADDRESS USAGE TYPE is a classification of an ADDRESS according to the function it serves. Examples include summer residence, fax, and pager. ADDRESS PURPOSE TYPE classifies what ADDRESS should be used in communicating with the PARTY. Examples include Statements; Promotions.

The model has the ability to capture a wide variety of information about PARTYs as illustrated in FIG. 3.2.5.

PARTY NAME is modeled as a flexible structure of multiple components rather than the traditional approach of a fixed set of attributes such as last name, first name, and middle initial. PARTY NAME is one or more PARTY NAME COMPONENTS that distinctively designate a PARTY. A PARTY NAME COMPONENT is a word or abbreviation that comprises all or part of a PARTY NAME. E.g., Mary (PARTY NAME COMPONENT 2), Smith (PARTY NAME COMPONENT 4), Jones. (PARTY NAME COMPONENT 3), Mrs. (PARTY NAME COMPONENT 1) are each name components that when sequenced as specified in the PARTY NAME COMPONENT would yield Mrs. Mary Jones Smith. This structure flexibly supports names which may have more than three components and which do not fit the 'traditional' structure.

In addition to capturing PARTY NAME, the model provides the ability to classify them. For example, Maiden Name (for an Individual PARTY); DBA: doing business as (for a BUSINESS PARTY).

A COMMENT is structured text providing background information about a Party. For example, 'This Party has a low risk profile from an investment perspective'. COMMENT TYPE classifies a COMMENT. Examples include Investment Risk Profile; Investment Interests.

PARTY LIFE EVENT is a significant occasion or occurrence for a PARTY. PARTY LIFE EVENT TYPE uniquely classifies a PARTY LIFE EVENT. Examples include Birth of a child; marriage; new home acquisition. It is included in this area of the model as such events often trigger INTERACTION EVENTs—as discussed below in FIGS. 3.4 and 3.5.

PARTY FINANCIAL PROFILE is a set of indicators that describes the fiscal characteristics of the PARTY while PARTY FINANCIAL PROFILE TYPE classifies the characteristic contained in PARTY FINANCIAL PROFILE, e.g., credit risk. SOURCE is the source that provided the information in the related entity. The SOURCE for PARTY FINANCIAL INFORMATION could be the PARTY or it could be a market research firm PARTY VALUE is an evaluation of the value of a particular PARTY over the expected duration of the relationship as defined by a particular PARTY VALUE SOURCE. As a PARTY may be 'valued' in different ways and may have different line of business values; the model includes PARTY VALUE SOURCE, which is the source that provided the evaluation of PARTY VALUE. PARTY VALUE TYPE classifies the value element(s) expressed in PARTY VALUE. Examples include Customer Profitability, Partner Relationship Value.

In recognition of the business need to differentiate treatments for high value customers and to improve customer service, the model supports three key constructs: CUSTOMER GUIDELINES, CUSTOMER TREATMENT and CUSTOMER SLA.

CUSTOMER GUIDELINES is a set of guiding rules for servicing a particular CUSTOMER or a group of CUSTOMERS defined by a PARTY GROUP. CUSTOMER TREATMENT is the action that is applied to a CUSTOMER when the CUSTOMER meets certain criteria. For example, if CUSTOMER is high value, waive fees up to $50.

CUSTOMER SLA is a set of metrics that bounds the expected degree of performance in delivering products and services to a CUSTOMER. Examples include Call Wait Maximum limit=10 seconds, E-mail Response=1 hour, Investigation Standard=4 hours.

It should also be noted that the model provides a single view of these constructs in support of the strategy of consistent treatment of customers across the business.

The PARTY PREFERENCE subject captures a PARTY's set of preferred choices for interacting with company 68 and for using products, of company 68. A PARTY can choose a wide variety of items to be tailored as shown in FIG. 3.2.6

PARTY PREFERENCE is a set of preferred choices for a PARTY. Examples include: English (preferred language), MS (preferred salutation), 2 PM to 5 PM (contact times). PARTY PREFERENCE TYPE identifies the particular aspect of interactions or product usage that is defined in PARTY PREFERENCE. Examples include SALUTATION, (e.g. Ms Vs Mrs. Vs Miss), which PARTY NAME should be used in communications; which Language the PARTY would like to be used in communications. SOURCE defines where the Party Preference information came from. The SOURCE could be the PARTY or it could be derived through analyzing transaction behaviors.

Party Preference also includes how a Party tailors a DELIVERY CHANNEL. A DELIVERY CHANNEL is a medium used for delivering products/services and for communicating with Parties. Examples include ATM, Internet, VRU (voice response unit), and Branch. PARTY DELIVERY CHANNEL PREFERENCE specifies how to tailor the DELIVERY CHANNEL for a particular product, service, or communication. This tailoring can be specified for an individual ACCOUNT as well. For example, John Smith's default withdrawal when using an ATM should be $120. If John Smith has two different accounts he could specify that the default withdrawal for one account is $120 and $300 for his other account.

PARTY PRIVACY is a set of choices a PARTY makes regarding information and actions that are considered discretionary or confidential. PARTY PRIVACY includes current choices as well as the history of choices previously made by the PARTY. PARTY PRIVACY TYPE classifies particular choice a PARTY makes regarding a PARTY PRIVACY element/factor. Examples include Mail Contact, Phone contact, Information Sharing. PARTY PRIVACY REASON describes the basis for specifying a particular PARTY Preference. Examples include Customer Stated, Deceased.

CUSTOMER ACCOUNT PARTY AUTHORIZATION PROFILE enables a customer to specify the permissions/legal powers a PARTY has for administering or using specific aspects of an account. Examples include who is an authorized check signer; who is permitted to view balances.

This area of model 112 is focused on the Customer's view of PRODUCT and ACCOUNT and reference is made to FIG. 3.3.

The model does not divide these entities into all of the business information needs for company 68 to manage products and accounts but rather selectively centers on those aspects that are of primary interest to a CUSTOMER or PROSPECT.

OFFERED PRODUCT is a set of services or financial instruments that is offered or could be offered to a PARTY and can result in generating revenue. OFFERED PRODUCTS can be owned by company 68, a PARTNER, or a COMPETITOR. Examples include Balloon Auto Loan, MASTER CARD, and VISA Gold Card.

An OFFERED PRODUCT may have one or more OFFERED PRODUCT FEATUREs that identify a characteristic of an OFFERED PRODUCT. Examples include PMI, escrow, and rate which are all features of a Mortgage.

OFFERED PRODUCTS are grouped into a hierarchy or tree structure. An OFFERED PRODUCT exists at one level of the tree structure.

OFFERED PRODUCT HIERARCHY labels (i.e., names) a group of OFFERED PRODUCTS for reporting purposes. It describes a node in the standard product hierarchy and how that node relates to the next higher level. For example, a Deposit is an OFFERED PRODUCT that is part of the PRODUCT FAMILY; a DDA and Savings are OFFERED PRODUCTS that are part of the PRODUCT CATEGORY within the DEPOSIT PRODUCT FAMILY.

An OFFERED PRODUCT often has associated with it FULFILLMENT INFORMATION that is a package of informational items regarding company Offered Products or services. It may be provided to a PARTY that was identified by an INTERACTION EVENT. An example includes a credit card booklet with its related application.

OFFERED PRODUCTS are serviced via a DELIVERY CHANNEL that identifies the communication medium used to distribute a particular product. Examples of a DELIVERY CHANNEL include: ATM, Internet, VRU, and Branch. A DELIVERY CHANNEL can also specify the owning branch for an ACCOUNT.

An APPLICATION is the information provided by a PARTY to subscribe to one or more OFFERED PRODUCTS. Examples include information supplied by PARTY Jane Doe when she submitted a request to obtain a new CHASE Platinum Credit Card; information supplied by Party John Smith when he requests a non-company product, from FIDELITY Brokerage Services.

An APPLICATION is made up of one or more APPLICATION COMPONENTs. An APPLICATION COMPONENT is a grouping of one or more pieces of information on an APPLICATION. APPLICATION COMPONENT TYPE classifies the content in an APPLICATION COMPONENT. Examples include Applicant Name and Address; Employment History, and Current Assets. This construct for APPLICATION has been included in the model in recognition of the desire to pre-fill an APPLICATION for CUSTOMERS who have provided this type of information when they subscribed to other OFFERED PRODUCTS.

An APPLICATION can result in a SIGNED AGREEMENT. A SIGNED AGREEMENT is a legally binding arrangement between the Company and one or more PARTIES. AGREEMENTS may lead to ACCOUNTs. In addition, a SIGNED AGREEMENT may be composed of a master agreement and one or more sub agreements as indicated by the curved arrow.

An ACCOUNT is a mechanism for administering the delivery of products and services to the Company's customers under an agreement. An ACCOUNT can be an INTERNAL ACCOUNT (i.e., delivers company 68 products and/or services) or an EXTERNAL ACCOUNT (i.e., delivers non-company products and/or services).

Two or more ACCOUNTS may be associated for a specific business purpose as defined by ACCOUNT LINKAGE and as described by ACCOUNT LINKAGE TYPE. Examples include ACCOUNT 0001-00001-002 is the savings account associated with ACCOUNT 0001-00001-001 for holding funds in excess of the minimum cash balance for ACCOUNT 0001-00001-001.

ACCOUNT FINANCIAL describes the financial characteristics of an ACCOUNT. ACCOUNT FINANCIAL TYPE classifies the ACCOUNT Financial. Examples include current balance, credit limit, current principal payment, and loan balance.

ACCOUNT STATUS describes the standing of an ACCOUNT at a particular point in time and ACCOUNT STATUS TYPE classifies the standing of the ACCOUNT. Examples include Open and Closed.

A company EMPLOYEE ACCOUNT ROLE defines the responsibility a company EMPLOYEE has for a specific account, e.g., account manager.

INTERACTION EVENT is the area of the model that captures the business information structures used in understanding interactions between a PARTY/CUSTOMER and company 68 as illustrated in FIG. 3.4

INTERACTION EVENT is an interaction between two parties regarding a customer request or customer service affecting issue. The INTERACTION occurs over a DELIVERY CHANNEL which is a communication medium used for delivering products/services and for communicating with PARTYs. Examples include ATM, Internet, VRU, and Branch.

INTERACTION EVENT TYPE classifies an INTERACTION EVENT as a SERVICE REQUEST EVENT or a CONTACT EVENT.

A SERVICE REQUEST EVENT is a type of an INTERACTION EVENT that describes a PARTY'S need for information or delivery of some aspect of a product or service. Examples include a request for current balance of an account; an inquiry regarding a statement; a request for funds transfer. Some service requests, such as a request for funds transfer, can result in a TRANSACTION which records the results of a business activity associated with the use of an OFFERED PRODUCT administered through an ACCOUNT.

An ACCOUNT can be involved in many INTERACTION EVENTS. ACCOUNT EVENT identifies an INTERACTION EVENT and the ACCOUNT involved and is classified by ACCOUNT EVENT TYPE. Examples of ACCOUNT EVENT TYPE include credit line increase.

A CONTACT EVENT is an action involving a specific communication between company 68 and a non-company PARTY or between two or more company PARTIES. Examples include a telephone conversation between a customer and a relationship manager, an e-mail from a company EMPLOYEE to a company CUSTOMER TEAM.

INTERACTION EVENTS can be linked to each other, as indicated by the curved arrow 206 labeled RELATED EVENT IDENTIFIER. This enables tracking events that are linked together as part of a process such as campaign execution. In addition, INTERACTION EVENTS can be grouped together to manage workflow supporting some types of INTERACTION EVENTS as shown by the curved arrow 208 labeled CASE. CASE is a unique number identifying a collection of related events All INTERACTION EVENTS generate an INTERACTION EVENT RESULT that is the outcome or conclusion of a contact, e.g., customer complaint resolved.

A REFERRAL identifies a PARTY for potential business opportunity that was recommended to company 68 or a PARTNER. A REFERRAL identifies the PARTY that is referred, who made the referral (a company BUSINESS UNIT, company EMPLOYEE, a PARTNER, or another PARTY) and who received the REFERRAL (a COMPANY BUSINESS UNIT, COMPANY EMPLOYEE, or a PARTNER).

A SURVEY is a set of questions posed in order to collect data for the analysis of some aspect of one or more PARTYs. An INTERACTION EVENT occurs with each PARTY to ask the questions. SURVEY RESULT is a set of SURVEY answers collected from PARTIES. Each set of answers from one PARTY is considered an INTERACTION EVENT RESULT.

FULFILLMENT INFORMATION is a package of informational items regarding company OFFERED PRODUCTS or SERVICES. An example includes a credit card booklet with its related application. It is provided to a PARTY based on an INTERACTION EVENT.

A CAMPAIGN is one or more operations, usually within geographical and temporal constraints, directed at one or more INDIVIDUAL PARTIES and/or BUSINESS PARTIES, and aimed at achieving a particular marketing goal. INTERACTION EVENT records the inbound and outbound communications, including offers, to support CAMPAIGN execution.

A company CUSTOMER TEAM is a group of company EMPLOYEEs that provide sales and services to customers and prospects. A company BUSINESS UNIT is responsible for/owns a company CUSTOMER TEAM. Company EMPLOYEEs belong to a company BUSINESS UNIT and can support one or more company CUSTOMER TEAMs.

Referring to FIG. 3.5, CAMPAIGN is the area of the model that is focused on understanding those aspects of CAMPAIGNS that will enable the company to better integrate Campaigns across lines of business and offer the most relevant opportunities to the customer. The model supports a closed loop marketing process and incorporates the concepts of building relationships with individual customers through one-on-one marketing and dynamic offers.

MARKETING SERVICE PROGRAM is a grouping of one or more CAMPAIGNS and is the highest, most strategic level of the marketing process aimed at cultivating relationships with PARTYs, showcasing company expertise, and providing an opportunity to offer company OFFERED PRODUCTS. A company BUSINESS UNIT owns a Marketing Service Program.

A CAMPAIGN is one or more operations, usually within geographical and temporal constraints, directed at one or more INDIVIDUAL PARTIES and/or BUSINESS PARTIES, and is aimed at achieving a particular marketing goal. A CAMPAIGN TYPE classifies a CAMPAIGN for a specific business purpose. Examples include retention and revenue enhancement A CAMPAIGN is guided by one or more CAMPAIGN OBJECTIVEs that describes a goal or measurable end result that a CAMPAIGN is expected to deliver. Within CAMPAIGN OBJECTIVE, a CAMPAIGN METRIC TARGET NUMBER is the quantifiable desired result to be achieved by the CAMPAIGN and the CAMPAIGN METRIC ACTUAL NUMBER is the quantifiable measured result achieved by the CAMPAIGN. CAMPAIGN METRIC TYPE classifies the measurable result of a CAMPAIGN OBJECTIVE, e.g., response rate, number of new account openings.

A CAMPAIGN is defined by one or more CAMPAIGN BUSINESS RULEs that describe the tactical elements governing a CAMPAIGN. Examples include who should be targeted; what offers and promotions are included; what messages are to be sent. CAMPAIGN BUSINESS RULE TYPE classifies a CAMPAIGN BUSINESS RULE. Examples include target audience; control group; offered products; messages.

A CAMPAIGN BUSINESS RULE is made up of one or more CAMPAIGN BUSINESS RULE COMPONENTs that is an element of a Campaign Business Rule. It is used to specify the rules for a particular aspect of a CAMPAIGN. Examples include 'Who should be specifically included as targets'; 'Who should be specifically excluded'; 'The conditions for sending a message in response to an observation.

A CAMPAIGN targets one or more PARTYs. PARTY CAMPAIGN REASON CODE classifies the specific rationale for the inclusion of the specified PARTY in the CAMPAIGN. Examples include high propensity to buy, expressed previous interest in offering, control group member. PARTY CAMPAIGN STATUS CODE, describes the current state of a CAMPAIGN for that PARTY, e.g., planned, initiated.

One or more CAMPAIGN company EMPLOYEE ROLEs support a CAMPAIGN that identifies the specific support that will be provided by a COMPANY EMPLOYEE for a specified CAMPAIGN. CAMPAIGN COMPANY EMPLOYEE ROLE TYPE classifies the specific CAMPAIGN COMPANY EMPLOYEE ROLE. Examples include Campaign Manager; Campaign Coordinator.

CAMPAIGN EXECUTION is captured through INTERACTION EVENTS that identify when a PARTY was contacted, with what offer or message, and the response of the PARTY to that aspect of the CAMPAIGN.

Figure 4:
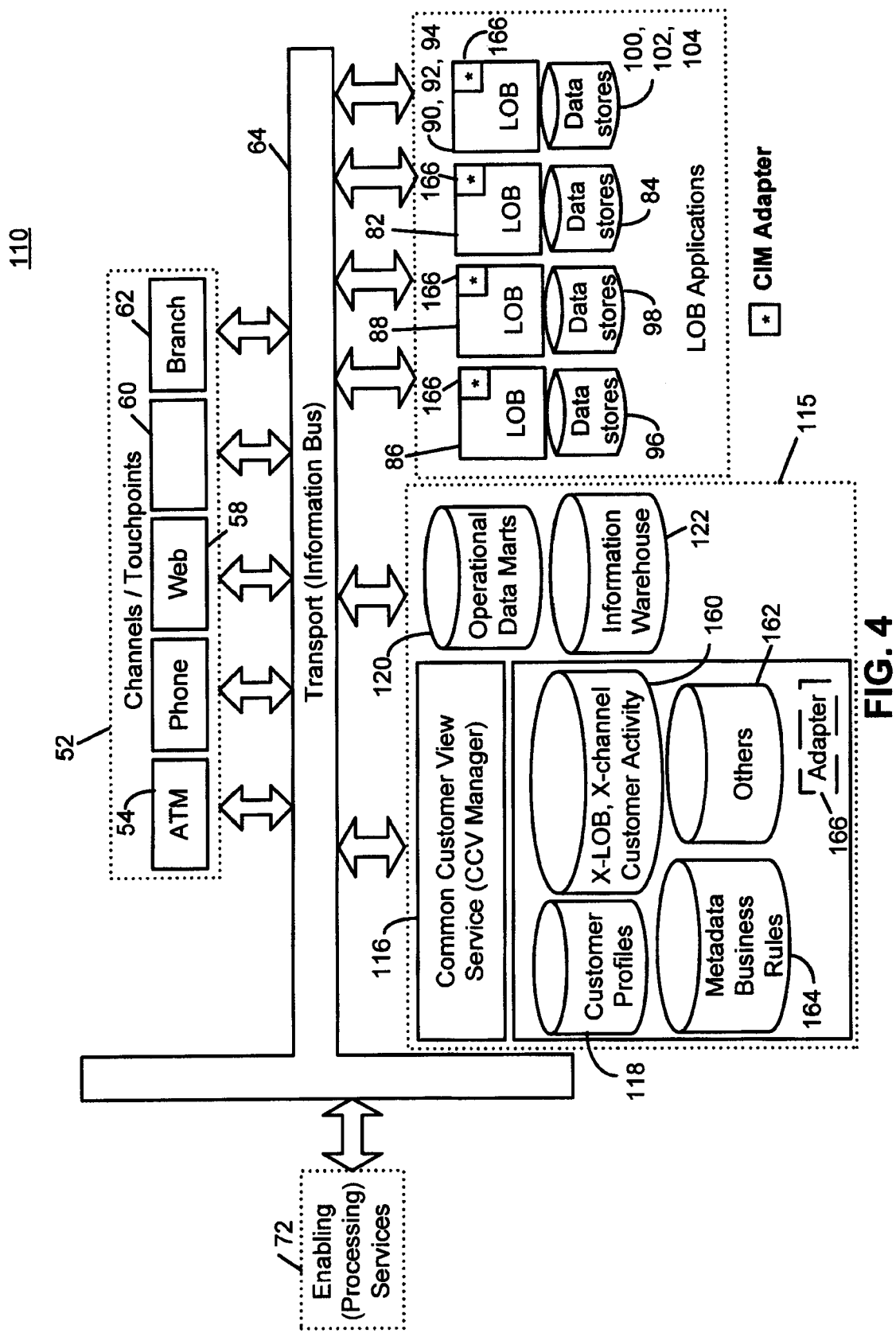
FIG. 4 is another system view of a customer information management system in accordance with the invention.

Referring now to FIG. 4, there is shown a more detailed view of customer information management system 110. As shown in FIG. 4, common customer view service 116 at customer server 115 includes a common customer view ("CCV") manager 117 and databases including customer profiles 118, cross-line of business, cross-channel customer activity 160, metadata and business rules 164, and other data 162. These databases serve to manage party and party-related information and may serve as an aggregation of dynamic customer activity information (e.g. key contacts, offers, service treatments) across lines of business, and support additional business-defined customer related key performance measures. These databases may also be a source of historical information for information warehouse 122 and other analytical data marts and decision engines, and allow for migration of data stores from infrastructure that has inherent technology risk—e.g. infrastructure which cannot be integrated with new technology.

Customer profiles database 118 includes information such as name, address, preferences, and value for customers of the system. Metadata and business rules 164 may support operations of the common customer view service 116 including identifying routing paths, identifying sources of authoritative information, and predefined routings of information updates.

Common customer view service 116 also optionally includes a customer information management adapter 166 at each line of business. Alternatively a central adapter (not explicitly shown) could be disposed at server 115 and may be used to translate the format of incoming data. As discussed above, each line of business may format information using similar terms with disparate meanings or may store similar data using different fields. Such lines of business classify data using a distinct format.

Adapter 166 preferably is unique for each line of business so as to enhance its translation functionality. Each customer information management adapter 166 translates the classification format of select information from the respective line of business using customer information model 112 into a common format used by service 116 and forwards the translated information to customer server 115. Additionally, requests from each line of business may be translated by a corresponding customer information management adapter 166, and forwarded to customer server 117 for processing so that each line of business may benefit from information stored in databases of other lines of business, and from information stored commonly by common customer server 115. Moreover, information (including requests) from customer server 115 in the common format are translated into the format used by the respective line of business.

Common customer view service 116 also includes a common customer view ("CCV") manager 117. CCV manager 117 locates and delivers customer related information that is maintained and managed within the line of business databases 96, 98, 100, 102, 104, 84 or cross-business data stores 118, 160, 162, 164. Common data need not be managed individually by the lines of business.

Figure 5:
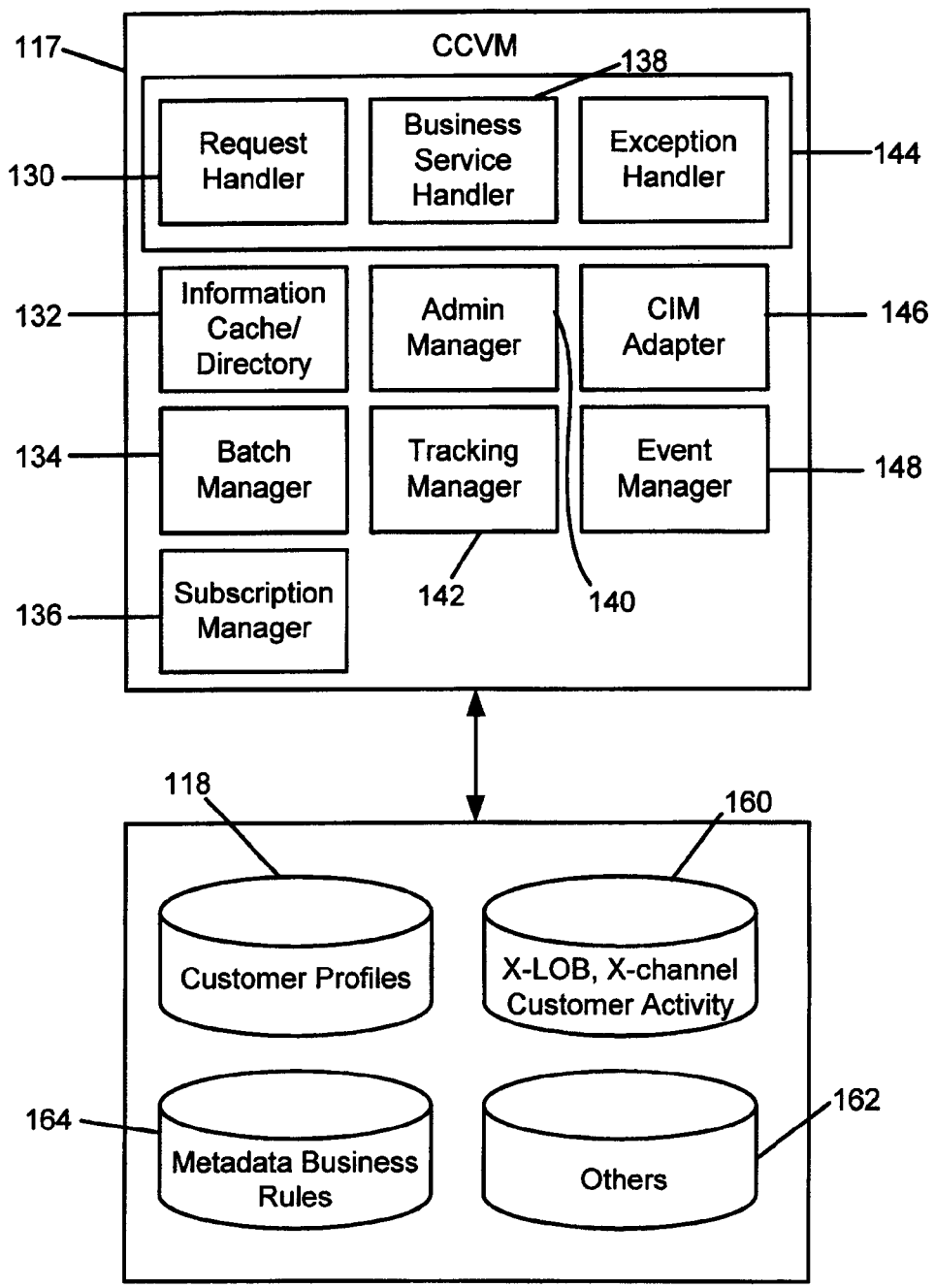
FIG. 5 is a block diagram of the functional elements in a common customer view manager in accordance with the invention.

An example of a CCV manager is shown in FIG. 5. Common customer view manager 117 includes a request handler 130, an information cache/directory 132, a batch manager 134, and a subscription manager 136. Common customer view manager 117 further includes a business service handler 138, an administration handler 140, a tracking manager 142, an exception handler 144, a customer information model adapter 146, and an event manager 148. Clearly, other arrangements for CCV manager 117 are available.

System 110 may be designed so that most communications conform to a uniform XML format ("CIM-XML format") using an XML transaction directory 114 (see FIG. 2 above) to thereby further increase integration of communication throughout system 110. Request handler 130 manages the servicing of client requests in a CIM-XML format and works with exception handler 114 to manage errors. Business service handler 138 manages information access, determines the proper message sets, sequencing, sources and destinations and access to data sources by interacting with information directory/cache 132, batch manager 134, and customer information management adaptors 146. Information cache/directory 132 identifies the authoritative sources of information. Exception handler 144 manages input which is not in the CIM-XML format referenced above.

Batch manager 134 manages batch interfaces in CIM-XML format. Tracking manager 142 tracks all requests in common customer view manager 116 for auditing purposes. Event manager 148 looks for events and notifies interested parties when relevant events occur. Event manager 148 uses subscription manager 136 to maintain a subscription table to ensure proper credit notification. Administration manager 140 processes administrative requests for configuration and resource management (including threads, message queues and location). Subscription manager 136 manages and organizes event alert subscriptions and associated repositories.

Figure 6:
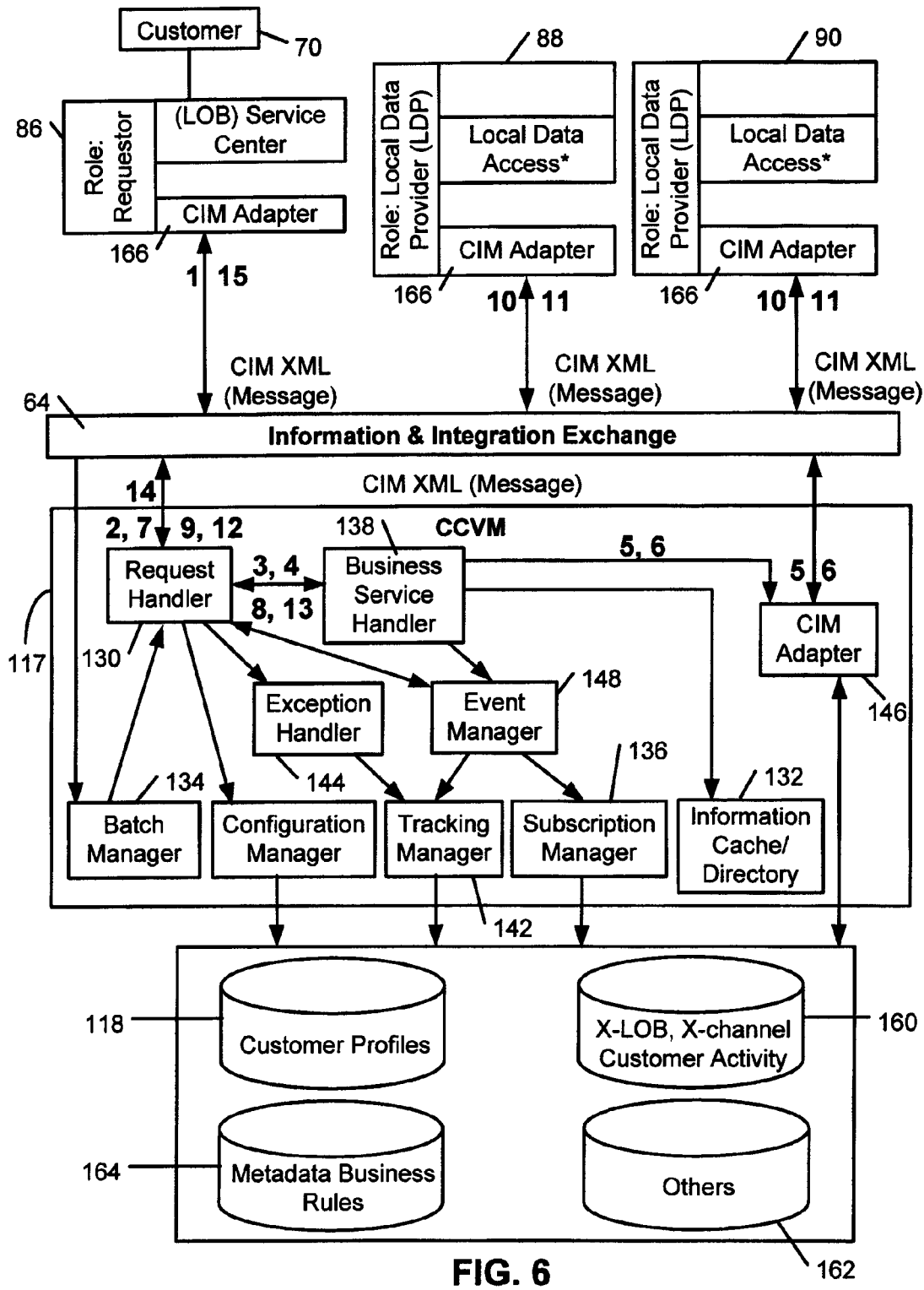
FIG. 6 is a logical flow diagram illustrating the operations performed by components of the invention in a first illustrative example.

Referring now to FIG. 6, there is shown an example of the operation of system 110. In the example, a customer contacts a service center. The service center checks for latest contacts the customer had with company 68 and determines that the customer is in the midst of a pending problem resolution. The service center relays the current status of the problem to the customer and sales pitches to the customer are pre-empted.

As shown in FIG. 6, customer 70 contacts service center line of business 86. Once customer 70 is authenticated at 1 customer information management adapter 166 formats the customer's information and forwards it to common customer view manager 117 through bus 64. Request handler 130 receives the information at 2 and forwards it to business service handler 138. Business service handler 138 at 3 receives the request for data, validates the message and determines the local data access for last key contacts. Business service handler 138 also prepares appropriate CIM-XML messages for information requests to other lines of business using data in information cache/directory 132. The messages produced by business service handler 138 at 3 are sent to request handler 130 at 4 and request handler 130 contacts the local data provider of the common customer view manager 117. The message from business service handler 138 is also sent at 5 to a customer information management adapter 146 in common customer view manager 117. Adapter 146 accesses cross-line of business, cross-channel customer activity database 160 and constructs a CIM-XML message in response. This new message is forwarded to request handler 130 through business service handler 138 at 6.

Request handler 130 contacts business service handler 138 at 7. Business service handler 138 receives the key contact information from cross-lines of business, cross-channel customer activity database 160, and identifies applicable lines of business, formats appropriate information and creates appropriate messages to be sent to each application at 8. Messages are sent from the request handler 130 to the applicable lines of business via customer information management adapters 166 at 9. Adapters 166 at lines of business 88, 90 in the example receive the CIM-XML requests and translate them to local protocols in each line of business to retrieve the appropriate data at 10. The appropriate data is determined, translated back again by adapters 166 and returned to request handler 130 at 11. Request handler receives the messages produced at 11 and contacts business service handler 138 at 12. Business service handler 138 prepares a response and sends it back to request handler 130 at 13. Request handler 130 sends the response to the requesting line of business 86 at 14. The adapter 166 of the requesting line of business 86 receives the final message and translates it to the customer service representative for display at 15.

Figure 7:
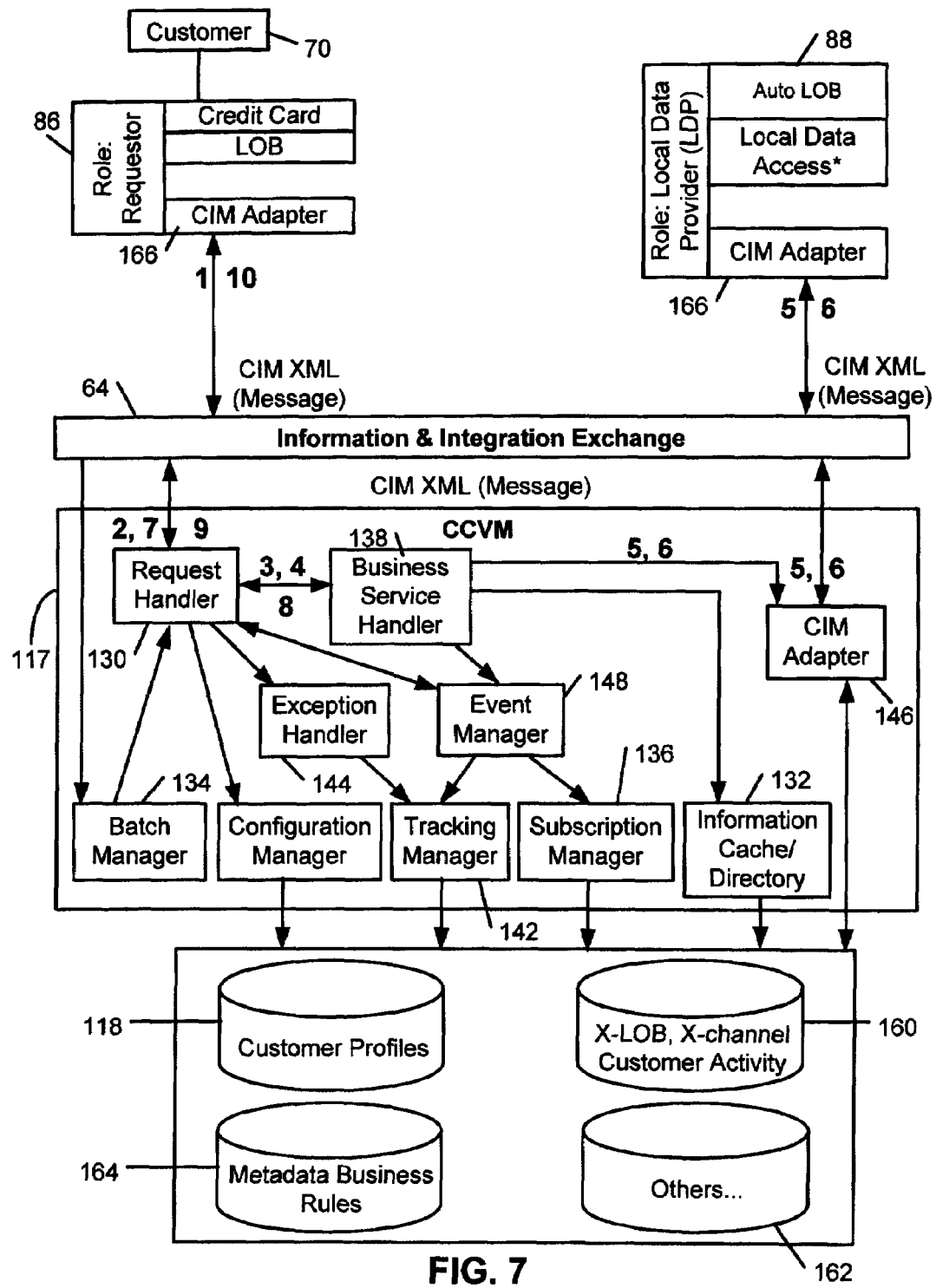
FIG. 7 is a logical flow diagram illustrating the operations performed by components of the invention in a second illustrative example.

Referring to FIG. 7, there is another example of system 110 in operation. In this example, a customer has automobile loan and a credit card. The customer calls the credit card service and notifies the company that his address has changed. The service representative sees that the customer also has the automobile loan and confirms that the customer wishes to change his home address on the automobile loan. The customer confirms and both accounts are updated.

As shown in FIG. 7, customer 70 contacts a service representative at credit card line of business 86 and indicates the he wants to update his address information. This request is translated by customer information management adapter 166 and sent to bus 64 at 1. Request handler 130 receives the message and contacts business service handler 138 at 3. Business service handler 138 accepts the request for data, validates the messages, determines the local data provider and prepares a CIM-XML message for this provider at 4. The customer information management adapter 146 receives the message determined at 4, accesses customer profiles database 118 and constructs a CIM-XML response message at 5. Customer information management adapter 142 returns the CIM-XML message to request handler 130 through business service handler 138 at 6. Request handler 130 receives the message produced at 5 and contacts business service handler 138 at 7.

Business service handler 138 handles the response message from the local data provider, prepares a response message for line of business 86 and passes the message to request handler 130 at 8. Request handler 130 sends the message created at 8 to line of business 86 at 9. Adapter 166 of line of business 86 receives the message created at 8 and formats it for line of business 86.

Figure 8:
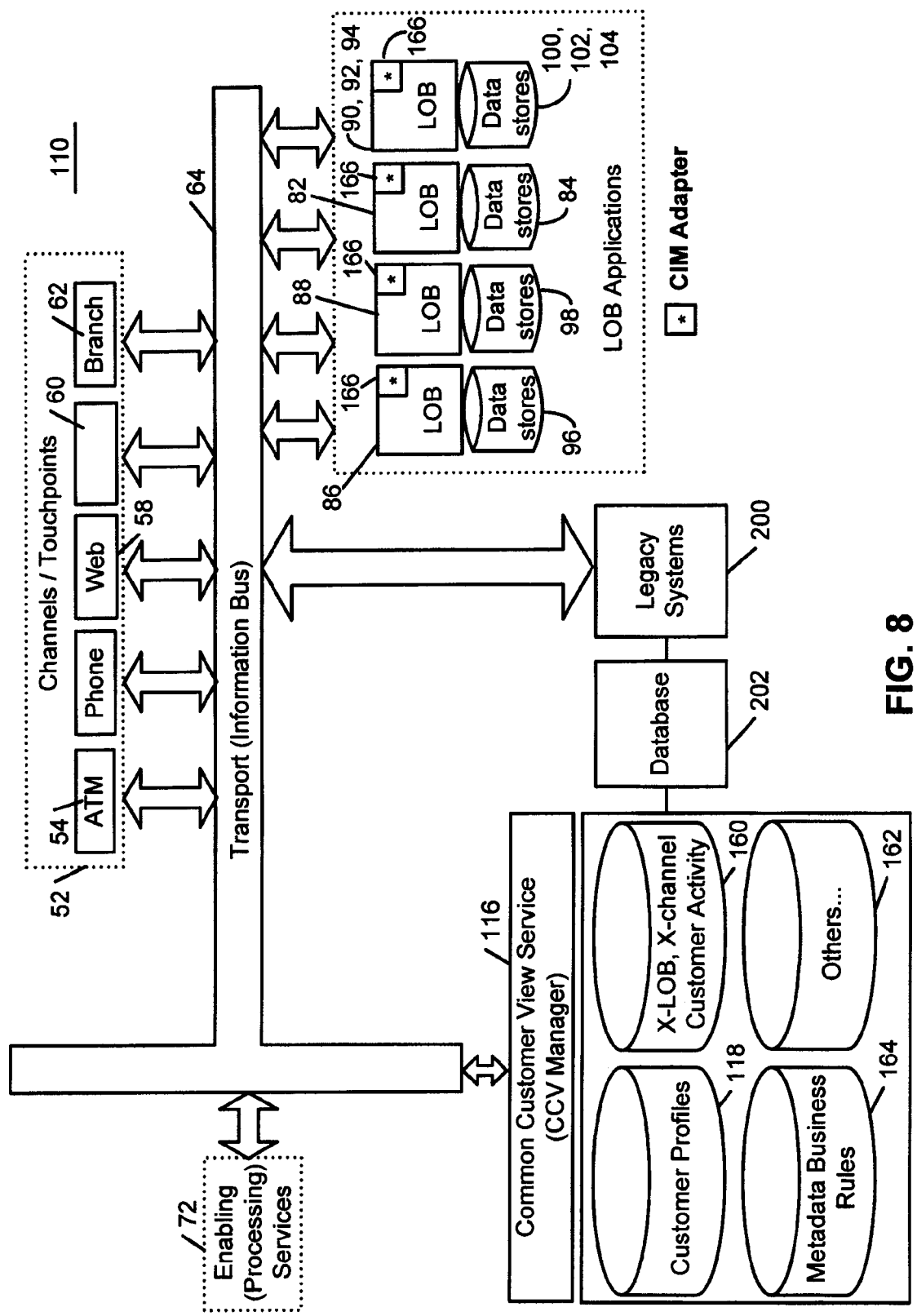
FIG. 8 is a system view of another embodiment of the customer information management system in accordance with the invention.

Referring to FIG. 8, there is shown another embodiment of system 110. As shown in FIG. 8, lines of business 86, 88, 82, 90, 92, 94 may all continue to communicate with existing legacy systems 200 and databases 202. Legacy systems 200 may include, for example, systems utilizing batch processing. Common customer view service 116 may also access databases 202. In this way, the lines of business need not necessarily switch over to using service 116 immediately and may, instead, still utilize some legacy systems 200.

Thus, by providing a customer information management adapter which can translate information from a line of business into a common format using a customer information model, data can be shared throughout a company and even across lines of business.

What is claimed is:

1. A customer information management system in combination with a plurality of lines of businesses, the combination comprising:
    a plurality of lines of businesses, each line of business having a database that holds respective information for operation of the respective line of business;
    a customer processor that inputs information from and outputs information to each of the line of businesses, the customer processor processing the information and storing information in a common database accessible to each of the plurality of lines of businesses;
    a plurality of adaptors, at least one respective adaptor for each particular line of business, each line of business communicating with the customer processor through a respective one adaptor associated with a particular line of business, each adapter being unique to the particular line of business, and each adaptor being adapted to:
        receive a request from its particular line of business, the request in a distinct format associated with the particular line of business, and translate the request into a common format for the customer processor, the adaptor outputs the request in the common format to the customer processor, and
        receive a request, in the common format, from the customer processor and translate the request into the distinct format associated with the particular line of business, the adaptor then outputs the request in the distinct format to the particular line of business; and
    the system arranged whereby each adaptor functions as a translator between the customer processor and a single line of business to which each adaptor is associated whereby each adaptor is dedicated to a particular line of business and whereby each adaptor processes data based on a respective local protocol of each respective line of business;
    the distinct format, of each line of business, being respectively unique to each particular line of business in contrast to other line of businesses;
    the system arranged whereby the plurality of lines of businesses communicate with each other through the customer processor;
    the plurality of adaptors communicating with the customer processor over an information bus; and
    the plurality of lines of businesses communicate requests for information through its own respective adaptor over the information bus for such information that is stored in another of the plurality of lines of businesses databases as well as information stored by the customer processor in the common database, wherein the response to the request comprises information from one or more of the plurality of lines of businesses individual databases as well as information from the common database, such requested information being translated through the plurality of adaptors over the information bus back to the requesting line of business.

2. The combination of claim 1, the plurality of adaptors includes at least two adaptors that are dedicated to the same line of business, whereby the particular line of business communicates with the customer processor through only the two adaptors.

3. The combination of claim 1, each adapter translates using a customer information model to translate data into a common format.

4. The combination of claim 3, the customer information model includes party, interaction, and campaign subject areas.

5. The combination of claim 4, wherein party comprises the following:
    all descriptive information about a customer, wherein the descriptive information comprises one or more of name, address, financial profile, preferences, demographics.

6. The combination of claim 4, wherein interaction comprises the following:
    business information structures involved in understanding interactions between the party and a company, consisting of the plurality of lines of business, wherein the interaction can be inbound which is initiated by the party or outbound which is initiated by the company or line of business.

7. The combination of claim 4, wherein campaign comprises the following:
    marketing targeted at one or more parties by the company, supporting a closed-loop marketing process.

8. The combination of claim 1, the plurality of adaptors are in communication with the customer processor through a communication bus.

9. The combination of claim 1, the request is useable to request information stored in a common database, the common database including information received from a plurality of lines of businesses.

10. The combination of claim 1, wherein the lines of businesses includes at least three lines of businesses, such three lines of businesses including a credit card service, a mortgage service, and an automobile loan service, and each of the such three lines of business having its own respective adaptor associated solely to such respective line of business.

11. The combination of claim 1, wherein the plurality of adaptors is provided to handle differing definition of terms between the lines of businesses.

12. The combination of claim 1, wherein the request requests customer information.

13. The combination of claim 1, wherein the system further includes a request handler, the request handler routing messages within the customer processor and sending messages to identified line of businesses in response to a request.

14. The combination of claim 1, wherein centralized enabling services operate on the communication bus, the enabling services including campaign management, common transaction access service, rule engines, and work flow processing.

15. The combination of claim 1, wherein the customer processor includes a common customer view service and associated databases, the common customer view service and associated databases comprising:

maintaining sources of customer information among the plurality of lines of businesses including databases of customer profiles and cross line of business, cross channel activity;

maintaining business rules for managing data integrity in a database;

tracking and managing selected customer information requests from the plurality of lines of business;

managing update requests for information;

managing data aggregation for selected customer activity, comprising one or more of the following: key contacts, offers, service treatments;

ensuring data integrity among the databases; and serving as a source of historical information.

16. The combination of claim 15, wherein the common customer view service includes a common customer view manager, the common customer view manager locating and delivering customer related information that is maintained and managed with a plurality of business databases or in the customer processor databases.

17. A method for sharing customer information among a plurality of lines of business servers, the method comprising:

producing a request at a first line of business for customer information stored in a second line of business, the first and second line of business classifying customer data using distinct and different formats based on different protocols;

translating, using an adaptor dedicated to the first line of business, the request from a first distinct format to a common format;

transmitting the request in the common format to a customer processor via an information bus;

routing the request by a request handler located in the a central processor in response to the request from the first line of business;

processing the request by the customer processor in the common format to produce a processed request;

transmitting the request by the request handler sending messages to a second line of business in response to the request from the first line of business;

forwarding the processed request from the customer processor, in the common format, to a second adaptor, the second adaptor dedicated to the second line of business;

translating the processed request, using the second adaptor dedicated to the second line of business, into a second distinct format used to classify customer data by the second line of business to produce customer information that is used by the second line of business.

18. The method of claim 17, each adapter translates using a customer information model.

19. The method of claim 18, the customer information model includes party, interaction, and campaign subject areas.

20. The method of claim 17, the first line of business is a credit card service and the second line of business is a mortgage service.

21. A computer based system for sharing information among a plurality of lines of business, the computer based system comprising:

a first line of business application comprising a first adaptor, the first line of business application producing a request for customer information and the first adaptor translating the request from a first distinct format to a common format;

a customer processor communicatively coupled to the first line of business application via an information bus, the customer processor receiving the request from the first adapter, routing the request by a request handler in response to the request from the first line of business, and generating a processed request;

the request handler transmitting the processed request message to a second line of business in response to the request from the first line of business, communicating the processed request via the information bus;

the second line of business application comprising a second adapter and being communicatively coupled to the customer processor via the information bus, the second line of business application receiving the processed request communicated by the customer processor via the communication bus, the second adapter translating the processed request into a second distinct format to classify customer data to identify customer information used by the second line of business application; and the first line of business is a credit card service and the second line of business is not a credit card service.

22. A customer information management system in combination with a plurality of lines of businesses, the combination comprising:

a plurality of lines of businesses, each line of business having a database that holds respective information for operation of the respective line of business;

a customer processor that inputs information from and outputs information to each of the line of businesses via an information bus, the customer processor processing and storing the information wherein the customer processor and a common database is accessible to each of the plurality of lines of businesses; and a plurality of adaptors, at least one respective adaptor for each particular line of business, each line of business communicating with the customer processor through a respective one adaptor associated with a particular line of business, each adapter being unique to the particular line of business, and each adaptor being adapted to:

receive a request from its particular line of business, the request in a distinct format associated with the particular line of business, and translate the request into a common format for the customer processor, the adaptor outputs the request in the common format to the customer processor, and receive the request, in the common format, from the customer processor and translate the request into the distinct format associated with the particular line of business, the adaptor then outputs the request in the distinct format to the particular line of business; and translate the request using a customer information model to translate data into a common format whereby the customer information model includes party, interaction, and campaign subject areas;

the system arranged whereby each adaptor functions as a translator between the customer processor and a single line of business to which each adaptor is associated whereby each adaptor is dedicated to a particular line of business and whereby each adaptor processes data based on a respective local protocol of each respective line of business; and the distinct format, of each line of business, being respectively unique to each particular line of business in contrast to other line of businesses;

the system arranged whereby the plurality of lines of businesses communicate with each other through the customer processor; and the plurality of adaptors communicating with the customer processor over an information bus;

the plurality of adaptors includes at least two adaptors that are dedicated to the same line of business, whereby the particular line of business communicates with the customer processor through the two adaptors;

the plurality of adaptors are in communication with the customer processor through a communication bus;

wherein the communication with the customer processor through the information bus uses a set of centralized enabling services comprising campaign management, common transaction access service, rule engines, and work flow processing;

the request is useable to request information stored in a common database, the common database including information received from a plurality of lines of businesses;

wherein the lines of businesses includes three lines of businesses offering different services, and each of the such three line of business having its own respective adaptor associated solely to such respective line of business;

wherein the plurality of adaptors is provided to handle differing definition of terms between the line of businesses;

wherein the request requests customer information; and wherein the system further includes a request handler, the request handler routing messages within the customer processor and transmitting messages to identified line of businesses in response to a request.

23. A method for sharing customer information among a plurality of lines of business servers, the method comprising:
producing a request for customer information at a first line of business whereby the first line of business classifies customer data using a distinct protocol;
translating, using an adaptor dedicated to the first line of business, the request for customer information from the first line of business's distinct format to a common format;
transmitting the request for customer information from the adaptor dedicated to the first line of business in the common format to a customer processor wherein the following steps are performed:
receiving the request for customer information from the first line of business at a request handler,
routing of the request for customer information by the request handler to a business services handler wherein the request for customer information is processed to obtain a location from a cross business, cross-channel customer activity database of a set of customer information that fulfills the request for customer information from the first line of business wherein the location of the set of customer information is at a second and third line of business and in a common database that is resident at the customer processor,
formatting of at least one fulfillment message in a common format by the business services handler to send to the second and third lines of business and the common database for the set of customer information that fulfills the request for customer information from the first line of business,
transmitting the at least one fulfillment message from the business services handler to the request handler,
interfacing by the request handler with the common database to obtain the set of customer information that is located therein to fulfill a part of the at least one fulfillment message and forwarding the part of customer information obtained from the common database to the business services handler,
transmitting the at least one fulfillment message over the information bus to the second and third lines of business whereby the at least one fulfillment message is received by the second and third lines of business respective adaptors dedicated to each line of business and in which the at least one fulfillment message is translated into a distinct format associated with the second and third lines of business respectively for processing of the at least one fulfillment message,
receiving a part of the set of customer information in response to the at least one fulfillment message from the second and third lines of businesses over the information bus from the second and third lines of business respective adaptors that have translated the part of the set of customer information into the common format,
transmitting the part of the set of customer information from the request handler to the business services handler,
aggregating the part of the set of customer information received from the second and third lines of business with the part of the set of customer information received from the common database into a single message consisting of a aggregated set of customer information in the common format for transmission back to the first line of business, and
transmitting the aggregated set of customer information to the first line of business via the information bus through the request handler, and
receiving, at the first line of business, using an adaptor dedicated to the first line of business, the aggregated set of customer information fulfilling the request for customer information whereby the aggregated set of customer information consists of customer information from the second and third lines of business and the common database.

24. A method for sharing customer information among a plurality of lines of business servers, the method comprising:
receiving a request for customer information at a request handler resident in a customer processor from a first line of business via an information bus whereby the request for customer information is routed from the first line of business by way of an adaptor dedicated to the first line of business that translates data from the first line of business's distinct format into a common format and then transmits the data in the common format over the information bus;
routing of the request by the request handler to a business services handler wherein a plurality of locations containing a set of customer information fulfilling the request for customer information is determined by accessing a cross line of business, cross channel customer activity database;
formatting a at least one fulfillment message to request the set of customer information from the plurality of locations containing the set of customer information whereby the plurality of locations consists of one or more of a common database and a plurality of businesses databases that contain the set of customer information fulfilling the request for customer information;

transmitting the at least one fulfillment message via the request handler to the plurality of locations that contain the set of customer information;

receiving the set of customer information in response to the at least one fulfillment message information via the request handler over the information bus;

routing the information to the business services handler wherein the set of customer information is aggregated and transmitted back the request handler in one aggregated set of customer data in the common format; and transmitting the aggregated set of customer information over the information bus to the first line of business wherein the aggregated set of customer information is received and translated into the first line of business's unique format by its respective adaptor fulfilling the request for customer information.

* * * * *